United States Patent [19]

DeLong

[11] Patent Number: 4,692,673
[45] Date of Patent: Sep. 8, 1987

[54] ELECTROMAGNETIC RECIPROCATING PUMP AND MOTOR MEANS

[75] Inventor: Sanford D. DeLong, 1367 Macklin, Ellisville, Mo. 63011

[73] Assignee: Sanford D. DeLong, Ellisville, Mo.

[21] Appl. No.: 760,255

[22] Filed: Jul. 29, 1985

Related U.S. Application Data

[62] Division of Ser. No. 351,272, Feb. 22, 1982, Pat. No. 4,541,787.

[51] Int. Cl.$^4$ ............................................. H02K 41/00
[52] U.S. Cl. ...................................... 318/132; 310/17; 310/30; 310/34; 310/35; 417/417
[58] Field of Search ...................... 310/17, 30, 34, 35; 318/114–132; 417/417

[56] References Cited

U.S. PATENT DOCUMENTS 2,686,280 8/1954 Strong et al. ...................... 310/30 X
3,433,983 3/1969 Keistman et al. .................. 310/17 X Primary Examiner—Donovan F. Duggan
Attorney, Agent, or Firm—Paul M. Denk

[57] ABSTRACT

An electromagnetic reciprocating motor or pump for use for providing mechanical force for actuation of other fluids or components, and includes a cylinder provided with closures at each end, at least a pair of electromagnets operatively associated with the cylinder, and surrounding the same, a magnetically responsive piston provided within the cylinder and capable of longitudinal shifting reciprocally within the cylinder upon the sequential energization of the electromagnets, and either a mechanical actuator or electronic triggering components cooperating with electrical circuitry and connecting with the electromagnets which upon energization charging the electromagnets in timed sequence for inducing their reciprocal shifting of the piston within the cylinder means. Electrical circuitry includes a power supply, a sequencing circuitry, coil driver circuitry, all of which upon their cooperative functioning provide for a regulating the rate, timing, and quantity of charge delivered to each of the particular electromagnets during operation of the reciprocating device.

7 Claims, 21 Drawing Figures

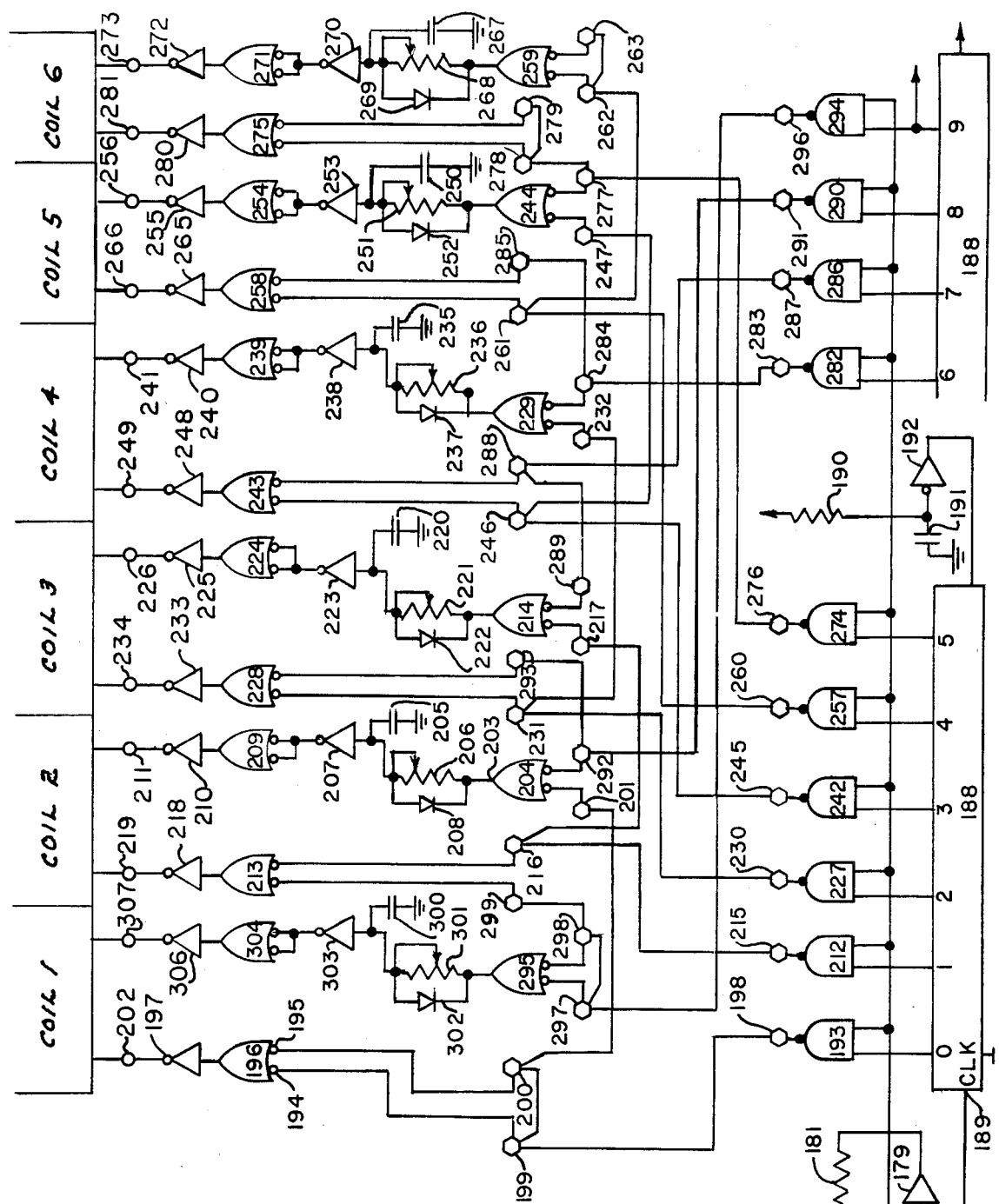

ELECTROMAGNETIC RECIPROCATING PUMP AND MOTOR MEANS

This is a divisional application of the application having Ser. No. 351,272, filed on Feb. 22, 1982 now U.S. Pat. No. 4,541,787, issued 9-17-85.

CROSS REFERENCE TO RELATED APPLICATION

The subject matter of this application relates to the subject matter of the disclosure document filed in the U. S. Pat. and Trademark Office on May 23, 1979, and granted disclosure document No. 081,012.

BACKGROUND OF THE INVENTION

This invention relates generally to an electromagnetic means, and more particularly pertains to a synchronously operating electromagnetic apparatus that can function to operate as a pump or linear force inducing motor means.

An abundance of prior art documentation and patents reveal the efforts of others to develop an electromagnetically operating pump, wherein the principle of inducing the linear movement of one means through the agency of one or more electromagnets have been of previous concern. For example, in the U.S. Pat. No. 4,160,924, to Elton Botts, and which patent is owned by the common assignee of this current application, there is disclosed a magnetic reciprocating motor system that has been found to operate more efficiently and effectively by maintaining an ambient cryogenic temperature condition surrounding the operating components, and particularly its electromagnetic coil assemblies. Therein the concept of a linear motor is disclosed, by reciprocating an armature means between electromagnets, as shown. But, the limits to this invention are that only a pair of electromagnets may be employed, and arranging intermediate thereof the armature means for attaining reciprocation between the same during its operations.

Other variations upon the concept of the aforesaid patent, and having relationship to the current invention, is also shown in the U.S. Pat. No. 3,443,128. to Faken, The concept of forming a pump which is electromagnetically driven so as to attain reciprocal movement for a piston located therein is shown in the earlier U.S. Pat. No. 1,684,468 to Brown. In addition, a similar type of concept for attaining operation of a refrigeration compressor that is electromagnetically driven is shown in the U.S. Pat. No. 2,515,110 to Bornstein. A related type of electromagnetic pumping device is shown in the Basilewsky U.S. Pat. No. 2,690,128.

A reciprocating motor control for an electromagnetic motor is shown in the U.S. Pat. No. 3,134,938, and is of interest from the standpoint of disclosing circuitry that functions to provide for a timed charging of electrical components for the purpose of attaining movement of a piston lineally therein, so as to force fluid to pass out of an associated conduit and through various check valves during the motor's operation. Thus, the Morgan patent is of interest for disclosing a reciprocating motor control that does show the use and combination of a magnetically operated motor and valves for attaining both fluid flow and control during its operations.

The patent to Blackwell, U.S. Pat. No. 3,282,219, discloses a double acting solenoid pump, which also contains ball check valves at either of its structured ends. The patent to Waltrip, U.S. Pat. No. 3,492,819, discloses a magnetic fluid pressure convertor which attains mechanical energy from a piston through the effort of reversing the polarity of an electromagnetically generated magnetic field caused from its associated magnetic coil assemblies.

The U.S. Pat. No. 3,791,770, to Farkos, discloses a similar type of electromagnetic pump or motor device that reciprocates a plunger within its structured bore of a motor cylinder. A solenoid surrounding the cylinder functions to reciprocate the plunger therein, so as to attain a pumping action.

The U.S. Pat. No. 3,754,154, to Massie, is of interest for showing a magnetically driven pump having an armature arranged within the air gaps for inducing its reciprocal movement therein, and a series of ball check valves within the inlet and outlet ports, at both ends of the armature, for attaining a pumping of fluid therefrom. In addition, another U.S. Pat. No. 3,884,125, to Massie is similar to his earlier invention as just previously described.

Finally, the U.S. Pat. No. 3,968,387, to Scarff, discloses a form of linear magnetic generator incorporating pole pieces that achieve reciprocation for a permanent magnet axially within its structured housing, and at the same time, contains a liquid helium that flows through the housing for the purpose of cooling the operations of the generator. Thus, the use of cryogenics for cooling the operations of a magnetic generator is disclosed in the prior art, as shown in this earlier patent.

It is, therefore, the principal object of this invention to provide a linearly reciprocating apparatus that can be used for either a pump or motor, and functions sequencially through the use of electrical or electronic circuitry that provides effective operations of the apparatus during sustained usage.

Another object of this invention is to provide a developed electromagnetic pump to be hereinafter described that effectively operates a pair or more of electromagnetic means arranged in series and which are sequentially energized so as to induce continuity in the reciprocating movements of its internally arranged piston, which in turn either functions in the nature of a pump, or can produce linear force and function as a motor means.

Another object of this invention is to provide a reciprocating means that has been devised to generate sufficient power or force in relation to its current input in order to provide an effectively and efficiently operating motor or pump means that has commercial application.

Still another object of this invention is to provide a reciprocating magnetic pump/motor that is operated sequentially through energization of its series of electromagnetic coils from a source of electrical energy supplied to the coils by a solid state sequential controller means.

Still another object of this invention is to provide a motor armature for a reciprocating motor means that is constructed in the form of a permanent magnet enclosed within a nonmagnetic retention means.

Another object is to provide a permanent magnet for reciprocating within a motor or pump and due to its generated forces exerted upon the moving fluids therein inherently has shock absorbing attributes as the magnet reaches ends of its stroke.

Still another object of this pump and motor invention is to provide the construction of honeycombed contained coils for electromagnets that are sequentially energized, to obtain controlled acceleration in the a sequential operation of the device so as to enhance the degree of force that can be achieved during its functioning.

Yet another object of this invention is to provide a reciprocating electromagnetic pump that can possibly exceed gravitational forces depending upon the length of the constructed apparatus and the number of electromagnetic coils arranged in series along its length.

Still another object of this invention is to provide an electromagnetic motor wherein its accelerated force peaks at the end of its piston strokes and at that region where maximum force is most desired for this type of a pump means.

Another object of this invention is to provide a magnetic pump wherein its output volume can be effectively regulated by controlling the length of travel of its contained piston and the number of strokes it receiprocates for a given period of time.

Yet another object of this invention is to provide an electromagnetic motor or pump means and whose electric coils can be varied in energization to produce the amount of electromotive force determined necessary for handling given loads from its operations.

Still another object of this invention is to provide an electromagnetic reciprocating pump or motor containing only a singular moving component, and that being the permanent magnetic piston contained within its holding cylinder.

An object of this invention is to provide a reciprocating motor or pump that is significantly low if not substantially eliminates any induced friction during its functioning.

Still another object of this invention is to provide a reciprocating motor means, or pump means, and which can be operated totally electronically or through a combination of electrical circuitry and mechanical cam means for achieving the timed and sequential energization of its electromagnetic coils that renders it functional.

Yet another object of this invention is to provide a reciprocating means that is reasonably simplified of design, containing relatively few if only one moving part, and can be easily and facilely manufactured and assembled with a minimum of skilled labor requirements.

These and other objects will become more apparent to those skilled in the art upon reviewing the summary of this invention, and upon undertaking a study of the description of its preferred embodiment in view of the drawings.

SUMMARY OF THE INVENTION

This invention contemplates the formation of a reciprocating magnetically induced motor or pump means; and which may be constructed to a variety of dimensional designs depending upon the end use intended for its power output. For example, the reciprocating means of this invention, where utilized as a pump, can be developed and constructed at a minimum diametrical dimension and therefore, can be used as a pump within flow lines at chemical processing plants, and even further, can be constructed of significant length, having a large number of a series of electromagnets constructed along its length, and then employed downhole within an oil well to achieve pumping of oil well fluids to the ground surface. In the alternative, this invention can be constructed as a more conventional pump or motor means, and particularly a linear force inducing motor means, wherein its series of employed electromagnets may be of substantial size, so as to furnish significant strength electromotive force for inducing both rapid and forceful movement of its contained piston for producing an output that may be more commercially feasible for industrial operations.

The reciprocating motor means or pump of this invention, being of an electromagnetic design, includes a cylinder means of some length, having a pair of closure means, end plates, or bulkheads, provided at either end, and being hermetically sealed therewith, so as to prevent the leakage of any fluids, including air, that is being pumped or induced to flow through the operations of this apparatus. A magnetically responsive piston means is provided within the cylinder means, and is capable of longitudinally shifting reciprocally within the said cylinder, upon sequential energization of a series of electromagnets that are arranged spacedly along the length of the cylinder means, and positioned externally thereof. At least a pair of such coils are provided along the length of the apparatus, but it is contemplated that as many as six to eight, or even more, up to an infinite number, can be utilized in the design of this apparatus, so as to provide for a reciprocating motor that can induce its internally contained piston to reciprocate at a variety of speeds, all of which may be controlled by the amount of charge conducted to the electromagnets during their sequential operation. These coils are sequentially operated, through control provided by means of electrical circuitry that may of the solid state type, and which includes a power supply, a sequencing circuitry means, a coil driver circuitry means, all of which when combined in the overall circuitry of this invention furnish precise charging of the associated electromagnet coils, in specifically timed sequence, so as to cause the force inducing piston to reciprocate at those speeds and to generate that force deemed necessary for attaining the operations desired for its specific functioning. In addition, mechanical timing means are also contemplated for the control of the operations of this electromagnetic reciprocating means, through the use of timing arranged cams which actuate relays for providing specifically timed energization of the associated electromagnetic coils for attaining similar results during the functioning of this reciprocating means.

A variety of valves, and perhaps even check valves, can be associated with this particular reciprocating means, and more specifically communicate with the internal chamber of this cylinder means and in which the piston reciprocates, so as to provide for continuity in the pumping of fluids through the operations of this pump means, whether it be to attain a one way pumping function, or in the alternative, to act as a double acting pump during its operations. In addition, the piston itself may be constructed in the manner of a check valve, so as to provide for a one way pumping operation during reciprocation of the magnetically controlled piston contained within the reciprocating means cylinder. Furthermore, and to achieve a minimum of pulsation in the pumping of fluids during the functioning of this pump means, it is contemplated that cavities or chambers may be formed at one or both ends of the apparatus, communicating with the chamber of the cylinder means, so that a bulk supply of fluids as pumped can be built up in these end disposed chambers and furnish a charging for continuous pumping of fluids through the operations of the pump without exhibiting any undesirable pulsation in the quantity of fluid being delivered during the pump means operations.

The piston itself, when subjecting the fluids to pressure, inherently acts as its own shock absorber, as at the ends of its stroke, due to the pressure build-up upon the fluids at these extremes during the pump's operation so as to reduce wear upon these components during functioning and thereby prolong the useful life of the apparatus.

In addition to the foregoing, and so as to provide peak efficiencies in the operation of this reciprocating means, it is contemplated that the formed electromagnetic coils may be constructed of honeycomb or cellular design, with its coil wires being arranged within cells that can accommodate the location or flow cryogenic material therein, so that reduced temperature conditions can be maintained at the coil locations and which have been found to increase the efficiency of operations of electromagnetic coils.

BRIEF DESCRIPTION OF THE DRAWINGS

FIG. 14 provides a circuit diagram of the solid state sequence board that determines the sequence of charging of the various driver boards as shown in FIG. 11;

FIG. 15 discloses a chart indicating the sequence of firing of each of the coil driver boards, and consequently their related coils, during the operations of the pump of this invention;

DESCRIPTION OF THE PREFERRED EMBODIMENT

Figure 1:
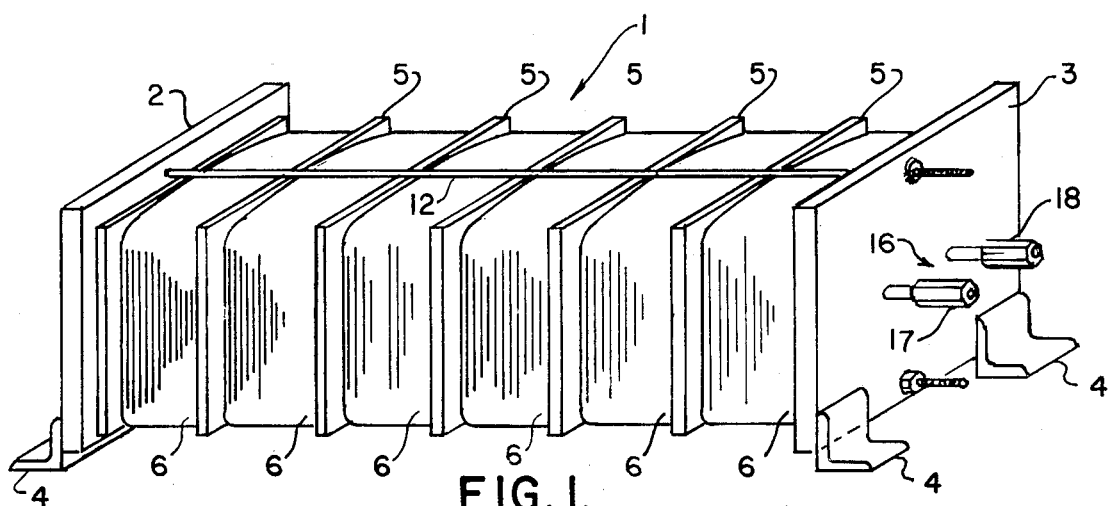
FIG. 1 discloses an isometric view of the electromagnetic reciprocating pump of this invention.
Figure 2:
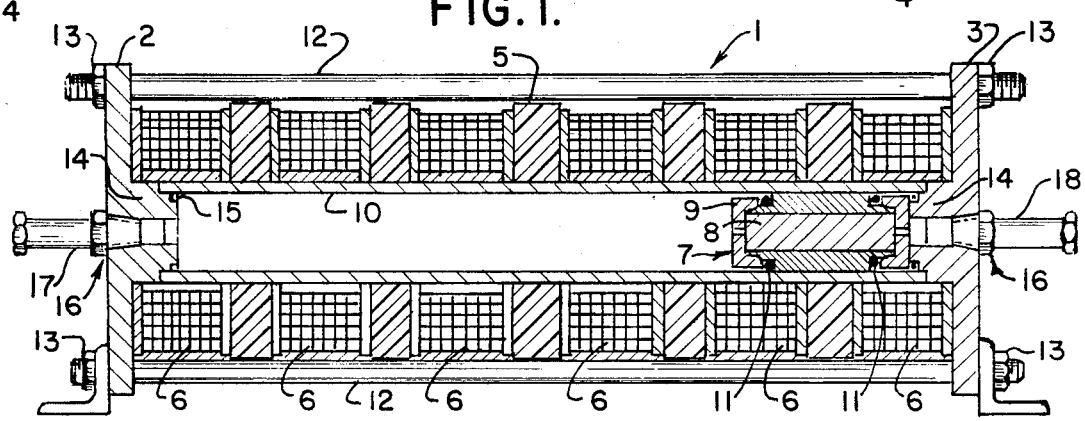
FIG. 2 provides a longitudinal sectional view of the pump shown in FIG. 1, taken along the line 2—2 of FIG. 3.

In referring to the drawings, and in particular FIGS. 1 and 2, there is disclosed the electrical magnetic reciprocating pump or motor means of this invention. The embodiment as shown in FIG. 2 comprises a pump incorporating an external casing 1 having a pair of end or closure plates 2 and 3, as shown, and including stabilizing feet, as at 4, integrally connected with each end plate in order to provide for firm resting of the pump upon a surface. Arranged intermediate the pair of end plates 2 and 3 are a series of spacers, as at 5, and arranged intermediate each adjacent pair of spacers is one of the coils, all of the same being shown at 6, and which are useful for being charged in sequence in order to provide for the operation of the driving mechanism within this pump. This driving mechanism, as can be seen more clearly in FIG. 2, is a reciprocating piston 7 and which is formed itself having an internally arranged permanent magnet 8 which is encapsulated within an outer shell or casing 9, as shown. In order to provide for greater efficiency in the operation of this pump, and more specifically of its magnet 7 as it passes through, reciprocatingly, the centrally arranged internal cylinder 10 of the pump, the casing 9 of the piston has a series of O-rings 11 provided therewith, in order to provide a greater seal between said piston and the internal surface of the cylinder 10, but yet not contact said surface so tightly in its seal that it prevents the freedom of movement for the piston as it is being reciprocated through the sequenced operating coils 6.

As can be determined upon viewing the configuration of the pump as shown in FIGS. 1 and 2, the pump may be made to any length so that its cylinder 10 can accommodate any length of travel for its piston, depending upon the number of coils and spacers that may be arranged intermediate the two end walls 2 and 3. Thus, depending upon the power requirements desired, and the capacity for the pump to move the amount of fluids desired, the pump can be made to almost any or infinite lengths. Also the various structural components for the pump, such as the tie rods 12, or the internally arranged cylinder 10, will vary in length depending upon the size of the pump desired. As can be seen, each tie rod 12 is tightly fastened at its ends, externally of the end walls 2 and 3, by means of any type of fastening means, such as the nuts 13, as shown. As can also be seen, each end wall 2 and 3 is formed having an internally projecting support, as at 14, and which functions as a seat for the cylinder 10, and which may also incorporate seals, as at 15, in order to prevent any leakage, or seepage of the pump at this location, and to maintain it contamination free. These seals may comprise a cryogenic type seal, being made of approximately of 35% glass, so as to function properly at both supercooled as well as ambient temperatures. In addition, the supports 14 also function as a means for holding the various valves 16, with these valves 16 principally functioning as an intake check valve 17 and a discharge check valve 18 during the operations of the said pump, as shown in FIG. 2.

Figure 3:
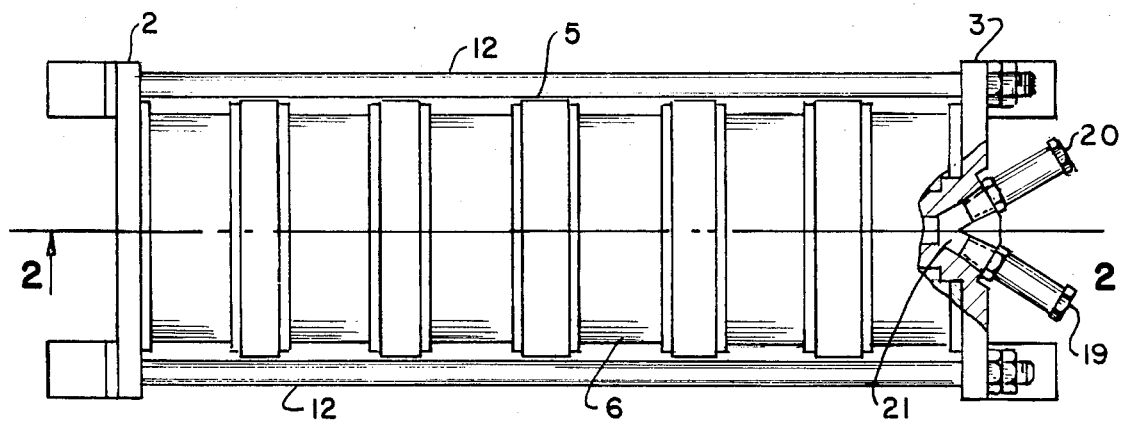
FIG. 3 provides a plan view of the pump disclosed in FIG. 1, with one end being partially broken away to disclose the intake and discharge check valves of the shown single stage pump.

During the mechanical operations of the pump disclosed in FIGS. 1 and 2, the various coils 6 will be sequenced in their charging along the length of the said cylinder 10, and due to the arrangement of the permanent magnet 8 within the piston 7, said piston will be urged by means of electromagnetic forces reciprocatingly to opposite ends of the pump, continuously. And, as this occurs, as for example, the pump may function either as single acting pump, as shown in FIGS. 2 and 3, but preferrably, due to the physical modified structure of the pump as shown in FIG. 5, also function as a double acting pump to provide for continuous charging and pumping of fluids throughout its operations. For example, as the piston 7 disclosed in FIG. 2 moves towards the left under the influence of the electromagnetic forces generated through the sequential and timed operations cf the coils 6, the intake valve 17 develops a suction that draws fluid into the chamber 10 of the said pump. Then, as the piston reaches the left extremity of the pump, and the coils are reversed in their polarity, a movement of the piston to the right forces the fluid to pass out of the discharge valve 18. While this is occurring, since both of these check valves 17 and 18 are one way valves, obviously, as fluid is being forced out of the discharge valve 18, the check valve 17 prevents any passage of fluid therethrough. In addition, as fluid is being drawn into the pump through the intake valve 17, the one way check valve 18 prevents any previously pumped fluid therethrough from returning back into the pump through said valve. At the same time, and as can also be seen in FIG. 1, since a pair of these check valves 16 may also locate at the right side of the pump, as also shown in FIG. 5, the pump can also function as a double acting pump, so that as the piston moves from the right end of the pump towards the left side, under the influence of the coil 6, the fluid is being drawn through the intake valve 17, to charge the said pump, and fluid may be passing out of a discharge valve provided at the right side of the pump. And, as the piston once again moves towards the right of the pump, and forces fluid out of the discharge valve 18, the intake valve 16 provided at the left side of the pump may be drawing additional fluid into the chamber 10 to recharge the pump at this side of the piston during its operations Thus the pump may function either as a single or double acting pump, as previously explained. But, when the pump is functioning in the capacity of a single stage pump, then the type of piston shown in FIG. 4 will be utilized within the pump cylinder 10. To the contrary, when the pump is functioning as a double or multiple stage pump, then the type of pistons shown in FIGS. 2 and 5 are utilized.

As shown in FIG. 3, the intake and discharge valves 19 and 20, respectively, may connect through a Y connection 21 formed integrally of the support portion 14 of the end plate 3, as shown, to accommodate the valve aspects of this single stage pump as shown within this said Figure. But, as one can readily understand, the end plate 2 may also be modified from that shown, and have a pair of check valves located therein, such as those shown at 19 and 20, in order to allow this particular pump to function also as a double acting pump, in a manner as previously described.

Figure 4:
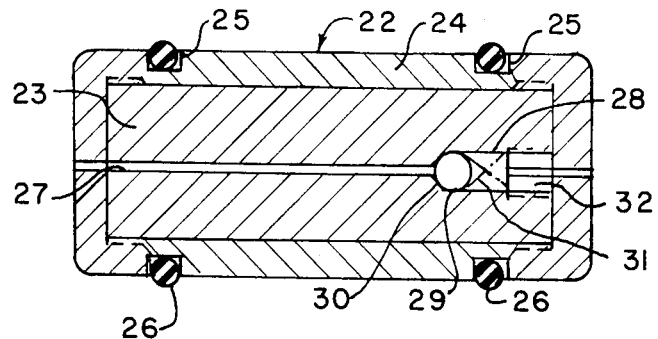
FIG. 4 provides a sectional view of the pump piston disclosed in FIG. 2, but further showing its modification into an integrally and internally arranged one way acting check valve type of piston.
Figure 5:
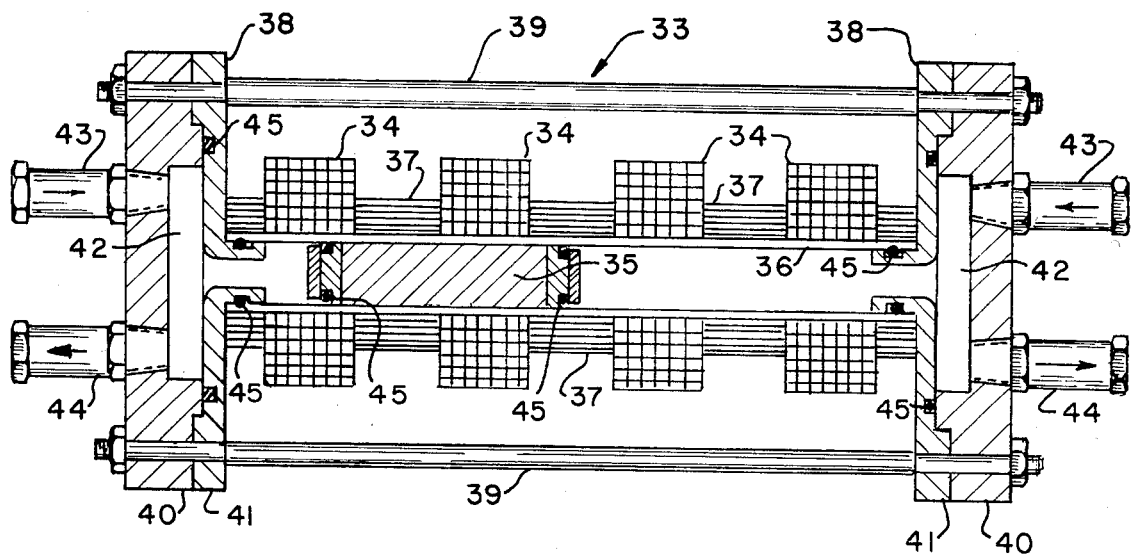
FIG. 5 provides a sectional view of a modified pump, comprising a double acting pump, and disclosing a lesser number of coils than the pump of the preferred embodiment shown in FIG. 1.

As already alluded to in FIG. 4, a modified form of piston 22 is disclosed. This piston will be used in lieu of the piston 7, previously described, for use in conjunction with a single stage acting type of pump, as shown in FIGS. 2 and 3. The piston 22 incorporates its own check valve means internally. The piston comprises a permanent magnet 23 having an outer casing or being encapsulated within a casing 24, and which casing may contain a series of annular grooves, as at 25, for holding the O-rings or seals 26, as shown. Extending entirely through the piston 22 is an aperture 27, and which aperture extends not only through the permanent magnet 23, but also through the end walls of the casing 24. The aperture 27 is enlarged into a greater sized cavity 28, and a ball check valve 29 is located therein. Thus, as this piston, when located within a pump of the style as previously explained, moves to the left, the ball check valve 29 unseats from its valve seat 30 and allows fluid to pass through the aperture 27, past the check valve 29, and out of the opposite or right hand side of the piston 22. But, as this piston is located within the pump and moves to the right, under the influence of the pump associated coils 6, as previously explained, the check valve 29 reseats against its valve seat 30, and thereby prevents the back flow of any fluid therethrough, but in addition, the force of the piston then urges the fluid out of the right hand side of the pump, while simultaneously recharging the supply of fluid within the chamber to its left. But, as can be understood by those skilled in the art, the type of pump in which this modified piston 22 is located may have a single check valve at either end of its structure. For example, there may be an intake valve located at the left hand side of the pump, so that as the piston moves from the left to the right within said pump, it will draw fluid into the cylinder 10 of said pump, while at the same time, the seating of the check valve 29 against its valve seat 30, thereby allows the moving piston to force fluid that has previously passed through it to be urged out of a single discharge valve located at the right hand side of the pump. But, as the coils reverse, and as this modified piston moves towards the left within the pump, at that time the intake valve, located at the left hand side of the pump, will close, but the fluid previously drawn into the cylinder 10 will then be allowed to pass through the piston 22, in preparation for its being pumped from the cylinder 10 when the piston reverses its movement and moves towards the right within the shown pump. Obviously, both of the discharge and intake valves will be closed as the piston moves from the right to the left, but both of them once again reopen as the piston moves from the left to the right within the shown pump, and forces previously drawn fluid contained within the cylinder 10 out of the discharge valve located to the right.

In order to make the modified piston 22, of FIG. 4, a little more sensitive in its functioning, it may be desirable to locate a bypassing spring 31 within the cavity 28, in order to assure that the ball check valve 29 instantly seats when required. And, a plug 32, having its aligned aperture therethrough, may be located within this end of the cavity 28, in order to assure the seating and retention of the ball check means 29 and its biasing spring 31 therein.

FIG. 5 discloses a slightly modified form of reciprocating pump 33, and is significant for showing that a lesser number of coils 34 may yet usefully function for reciprocating its permanent magnet 35 within the cylinder 36. These coils are arranged apart by means of the spacers 37 and end walls 38 in cooperation with the tie rods 39 to hold the pump firmly and securely together.

The end walls 38 of the shown pump are constructed slightly differently from those previously described, in that each end wall may be formed as a bulkhead having of a pair of components 40 and 41, and which arrange a cavity 42 therein, so that as this double acting pump is functioning, sufficient quantities of fluid will be yet contained within the pump, within its said integral cavities, and maintaining its charging, so that the movements of any fluid through the operations of this pump will be consistently uniformly performed with a minimum of pulsation or cavitation. And, the check valves shown mounted to each end of the end plates 38, and comprising the intake valves 43 and the discharge valves 44 are each one way valves, as can be understood, thereby providing for the intake of fluid as at one end of the pump as the piston moves towards the opposite end, while simultaneously providing for a discharge of fluid previously drawn within the cylinder 36 from the discharge valve 44 located at the opposite end of said pump. And, in order to maintain uniformity of fluid flow, the intake valves 43 may be connected together, to draw fluid from a singular source, while at the same time, the pumps discharge ports 44 may likewise be coupled together, in order to provide for the pumping and flow of the fluid to the situs of its usage.

As can also be noted in FIG. 5, and more specifically in the formation of the electromagnetic coils 34, said coils are formed in the configuration of a cellular latticework, for holding of the integral wires of the electromagnet, and through such construction forms a honeycomb configuration which leaves sufficient spacing between wires to assure adequate and convenient ventilation of the wires to maintain their cool operation during the pump's functioning. As is known, the cooled coils can provide for operation of electromagnetic coils at lesser resistance to current flow, and therefore, the more efficiently the coil functions within the operation of the pump of this invention. To maximize pump efficiency, and particularly in its electromagnet's operations, a cryogenic substance, as is known in the art, can be flowed through these cellular structures to assure the maintaining of supercooled temperatures thereat. Also, to assure the efficiency of operations of this pump for maintaining fluid flow, the end walls of the pump, in addition to the piston itself, contain a series of seals, such as the O-rings 45, as shown, and which effectively seal against fluid leakage therepast during pumping operations.

Figure 6:
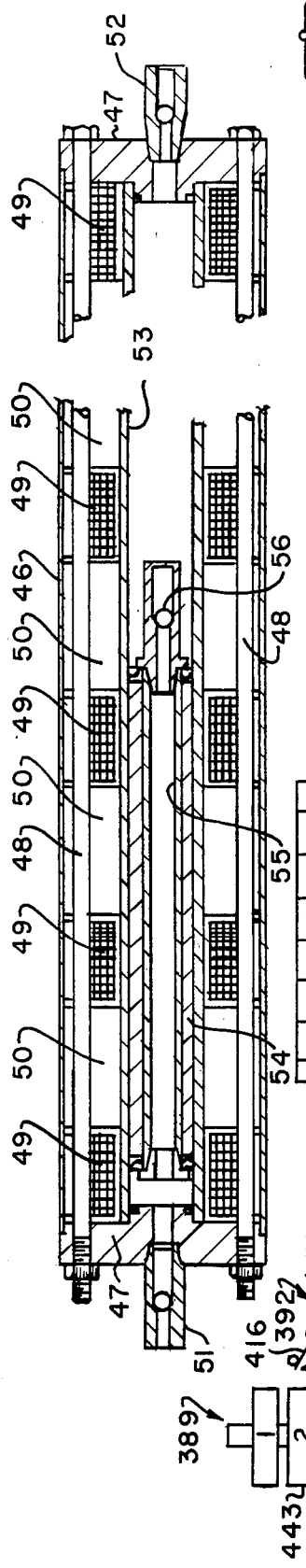
FIG. 6 discloses a partial sectional view of the further modified pump of the type previously identified, but having lesser diametric dimensions so as to provide for its use within the casing of an oil well, water well, or similar structures of thin line construction.

FIG. 6, as previously described, shows yet another modification to the pump of this invention. In fact, the embodiment shown can also effectively function as a linear force inducing motor. As disclosed, this particular pump is useful, as by way of example, for down well operations, having a rather thin line or thin diametrical dimension, in order that the pump may conveniently fit within tubing, casing, pipe, etc., and yet function effectively for pumping fluids, as for example oil to a surface, all as previously summarized. The pump of this configuration is of the single acting type, and comprises an outer casing 46 that is connected to the end walls 47, as shown, and held in position by means of the tie rods 48, or related type connecting means. Arranged within the casing 46, and intermediate the end walls 47, are the coils 49 which may be constructed in the manner of the coils as previously described. Spacers 50 are arranged intermediate the coils 49, and function to stabilize the structure of the pump into a compact unit. It might be described that these spacers 50, just as the spacers 5 and 37 previously analyzed, may be constructed of any nonconducting material, such as plastic, bakelite, or the like, and function to provide structural support for the pump intermediate the coils, but not conduct any charge or electromagnetic waves therethrough. Connecting with the end walls 47 are single acting one way valves, such as the check valve 51, as shown, connecting to the downward or left side of the said pump, while another check valve, that which may be more aptly described as the discharge valve 52, connects with the upward or right side of the shown pump. Internally in the pump is arranged a cylinder 53 and which forms the cavity through which the piston 54 moves. The piston 54 likewise has an aperture 55 arranged therethrough, having its check valve 56 located at its upward end. Thus, in operation, a pump of this thin line construction can be lowered down into the well casing, be submerged within the fluids therein, and once operating, the coils force the piston 54 to reciprocate within its cylinder 53. When this occurs, as the piston 54 moves downwardly within the pump, the fluid previously drawn within the cylinder 53 pass through said piston 54, past its one way check valve 56, and recharges the upper end of the cylinder 53. During this function, the check valve 51 remains closed, so that the piston does not force any fluid to pass out of the downward end of the said pump. Then, after the piston reaches the lower extremities of the pump, and is arranged in the manner as shown in FIG. 6, it begins its movement upwardly, and at this stage, its check valve 56 closes, and thereby forces any fluid arranged above it within the cylinder 53 to be forced out through the discharge valve 52, and to be pumped to the surface. As this is occuring, additional fluid will pass through the now opening intake valve 51, and be drawn into the lower end of the cylinder 53, recharging it for the next sequence of the pump's operation.

The application of this invention for use as a motor, and more particularly a linear force producing motor, can be best illustrated upon reviewing FIG. 6 of this invention. In the modification of this apparatus for use as a motor, the piston 54 will be of a solid state type, not containing any valve, nor necessarily any aperature, such as at 55, located therethrough. Check valves 51 and 52 will be avoided at the end walls 47, but the piston 54 will have rods integrally extending from one or both of its ends, and through the apertures provided through each end wall 47, so that as the piston 54 is reciprocated within the cylinder 53, its associated drive rods will likewise linearly reciprocate externally of the cylinder 53 and its end walls 47, to provide mechanical means furnishing force externally of the apparatus and which can be translated for use for driving other mechanisms. For example, rack and pinion connections, or any other type of gear drives, may be driven through the usage of this style of linear force inducing motor, and function specifically as an electromagnetic reciprocating motor in its application.

Figure 7:
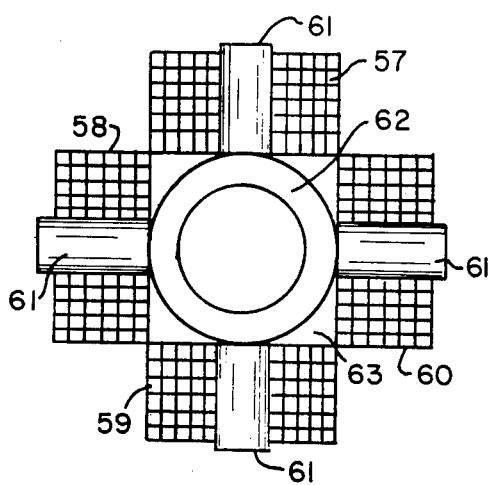
FIG. 7 discloses a further modification to a pump and showing a series of four coils arranged around the periphery of the pump piston, and which furnishes enhanced force for use for industrial applications.
Figure 8:
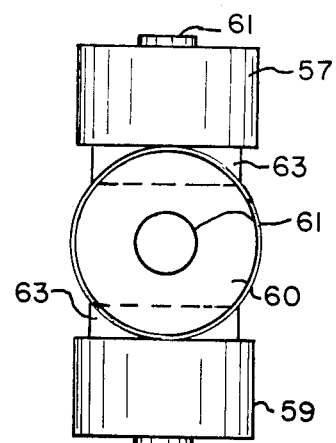
FIG. 8 provides a side view of the multiple type coil of the modified pump disclosed in FIG. 7.

FIG. 7 discloses a further modification in the pump's structure, and more specifically, in this instance, forming a series of connected coils around the perimeter of the pump cylinder and its piston. Forming the coils in the configuration as shown in FIG. 7 enhances the electromagnetic force generated at each coil station, such as for the coils 6, 34 and 49, as previously identified. More specifically, these coils are formed as a series of four subcoils, each shown at 57 through 60, but which are series connected by way of a single wire that connects at its end to the next adjacent subcoil, throughout all four of the said wound coils. The core for the coil comprises a series of studs, as at 61, and which are connected or integrally formed with a soft iron core formed cylinder 62, and which is surrounded around its perimeter with additional soft iron, as at 63, to assure that any electromagnetic waves produced through the operating subcoils exerts its maximum and efficient electromagnetic forces to the interior of the core 62. In fact, all of these components such as the stud 61, and the soft iron cores 62 and 63 could be integrally cast in a single operation during their manufacture. And, to assure the maximum efficiency and operation of the core of this design, it can be seen that these cores 57 through 60 are wound in the honeycomb fashion, as previously described, and may be encapsulated within their structure, be cryogenically cooled, all in order to assure the peak production of generated electromagnetic forces through their cperations. A side view of the assembled core is also shown in FIG. 8. The core formed cylinder 62 then locates upon the pump or motor cylinders 10, 36 or 53, as previously analyzed.

Figure 9:
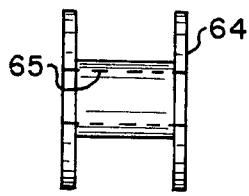
FIG. 9 discloses a spool of the type that is normally used to wind a coil for use in conjunction with the assembly of the pump of this invention.
Figure 10:
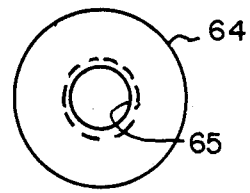
FIG. 10 provides a side view of the spool disclosed in FIG. 9.

A slight modification to the formation of the coils 57 through 60 is shown in FIGS. 9 and 10, and these comprise spools 64 which are useful for receiving the layer wound type of electrical wire for use for forming electromagnetic coils, and which may then be simply slid onto the studs 61 of the composite coil as previously described in FIG. 7. Obviously, though, a combination of four usually series wound coils are required for forming each of the subcoil assemblies shown in FIG. 7. But, once wound, these coils may simply slide onto the studs 61, which will project into and perhaps through the formed aperture 65 provided through each said spool.

The cooperation between the internal or pumping cylinder of this invention and its sealed containment of the magnetic piston have significance from the standpoint that mechanical variations upon its operation can be obtained by either increasing or decreasing the diameter of the bore of the cylinder, or by increasing the length of the cylinder itself. Pressure outputs or mechanical forces derived from the operations of this reciprocating means can be obtained through the adjustment of the electrical rate that is condusive to controlling the speed and distance of the piston travel within its cylinder. And, the rate of piston stroke can be varied through the sequential control of its electronic controller, as described in this application. What is more pertinent in this invention is that it does provide for a significant reduction in the amount of electrical charge consumed during its functioning. For example, the variety of electromagnetic coils, shown within the preferred embodiment, need not all be energized simultaneously to obtain a full and complete operation of this reciprocating apparatus. This is so regardless of the number of coils contained within the apparatus, whether it be a pair of the same, or whether there be an infinite number of coils energized along the length of the apparatus. In addition, where the device may be of significant length, and there may be a number of pistons contained within the cylinder along various segments of its length, or where a series of these pumps are coupled together in order to provide a booster relationship between their operations in order to effect fluid pumpage, any number of the adjacent coils may be energized at any given moment. But, to effect energy savings, only two of the coils need be energized at any given time, usually to opposite polarities, so that while one coil may be negatively charged for inducing the piston to move away from it, the next adjacent coil may be momentarily positively charged for attracting the piston in its direction of movement. Thus, in the style of the invention shown in FIG. 5, where there are four electromagnetic coils provided, that when the coils therein as shown being numbered, as for example, 1 through 4, counting from left to the right, only an adjacent two of such coils need be energized at any time, in order to attain maximum efficiency from the operations of this pump/motor means. A chart disclosing the steps of charging of the various coils in order to effect piston reciprocation is set forth as follows:

---

OPERATION SEQUENCE

Coils are number from left to right #1-#2-#3-#4
Initially (Start) STep #1

---

Coil #1 Charged Neg.
Coil #2 Charged Pos.
Coil #3 Off
Coil #4 Off
(Magnet Armature moves from left to right.)
Step #2

Coil #2 Charged Neg.
Coil #3 Charged Pos.
Coil #1 Off
Coil #4 Off
(Magnet armature moves farther to right.)
Step #3

Coil #3 Charged Neg.
Coil #4 Charged Pos.
Coil #1 Off
Coil #2 Off
(Magnet armature moves to stop at right.)
Step #4

(Return stroke - from right to left)
Coil #4 Charged Neg.
Coil #3 Charged Pos.
Coil #2 Off.
Coil #1 Off
(Magnet armature moves from right to left.)
Step #5

Coil #3 Charged Neg.
Coil #2 Charged Pos.
Coil #4 Off
Coil #1 Off
(Magnet armature moves from right to left.)
Step #6

Coil #2 Charged Neg.
Coil #1 Charged Pos.
Coil #3 Off
Coil #4 Off
(Magnet armature moves to stop at left - end of traval.)
ONE COMPLETE CYCLE

---

As can be well understood from reviewing the mechanical aspects of this invention as previously described, the precise electrical functioning of the various components integrated into this structure is quite essential. Thus, various coils contained within the pump or motor structure must be energized instantaneously at select periods of time, in order to provide for the uniform and forceful movement of the piston reciprocatingly within the apparatus structure, and more specifically, its internally arranged cylinder. As further shown in the drawings, and more particularly in FIG. 11, displaying a schematic of the electronic layout, it can be seen that the power supply 66 to the pump may comprise the standard alternating current power supply, it may comprise a direct current power supply, or in the alternative, it may comprise an alternating current power supply that converts the charge into a direct current supply. In addition, the power supply may comprise a direct current battery, such as shown at 67, and one which may even be recharged by means of a pack of solar cells, as at 68, or recharged by other energy source. From either of these power supplies or the battery the charge is conducted to the sequence board 69 wherein the charge is selected and sequenced for providing for the timed operations of the electromagnetic coils that provide for operation of the piston within the aforesaid pump, with each particular coil receiving its regulated charge through the shown coil driver boards 70 that function in cooperation with the individual coils 71, of the type as previously shown and described. By way of example, the four coil pump or motor as shown in FIG. 5, and the related Figures, may be energized through the sequence of operation of four coil driver boards shown in this FIG. 11. Obviously, if the style of pump shown in FIG. 2, or that shown in FIG. 6 is to be energized, then a corresponding number of coil driver boards will be continued to provide for the energization of each coil by its own individual board. But, as previously explained, the pump, such as shown in FIG. 5, may include four coils in its operation, as for generating the necessary electromagnetic flux for actuation of the magnetic piston, as shown at 72. But, it is just as likely that the pump may be reduced down to two such coils, and obtain some semblance of reciprocal movement for its piston therein, or increased to a multiple of coils, even to an infinite number, to induce piston reciprocation. What is essential though, is that the multiplicity of coils can be actuated at a low current consumption, and yet attain significant force and fluid's volume output, or created motor force, even in view thereof.

Figure 11:
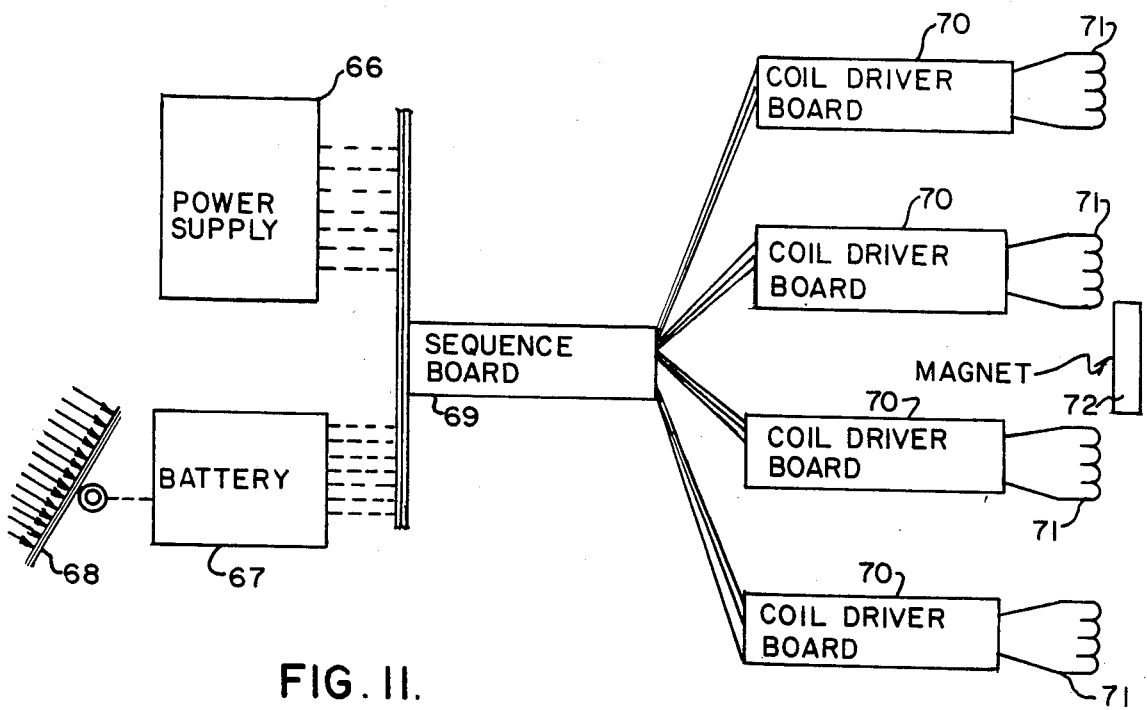
FIG. 11 provides a schematic view of the sequence layout for the solid state controller useful for driving the pump of this invention.

As shown in this schematic electronic layout drawing, in FIG. 11, the coil driver boards all generate an electromagnetic flux which is used for reciprocating the said piston, as identified therein. By use of the voltage and current regulated power supplies as herein identified, considerable savings are made with respect to the amount of current consumed through the requirements of this operating pump, particularly when operated under cryogenic temperature conditions, as previously reviewed. Although, and as can be well understood, this pump may also be operated under ambient temperature conditions, as aforesaid.

Figure 12:
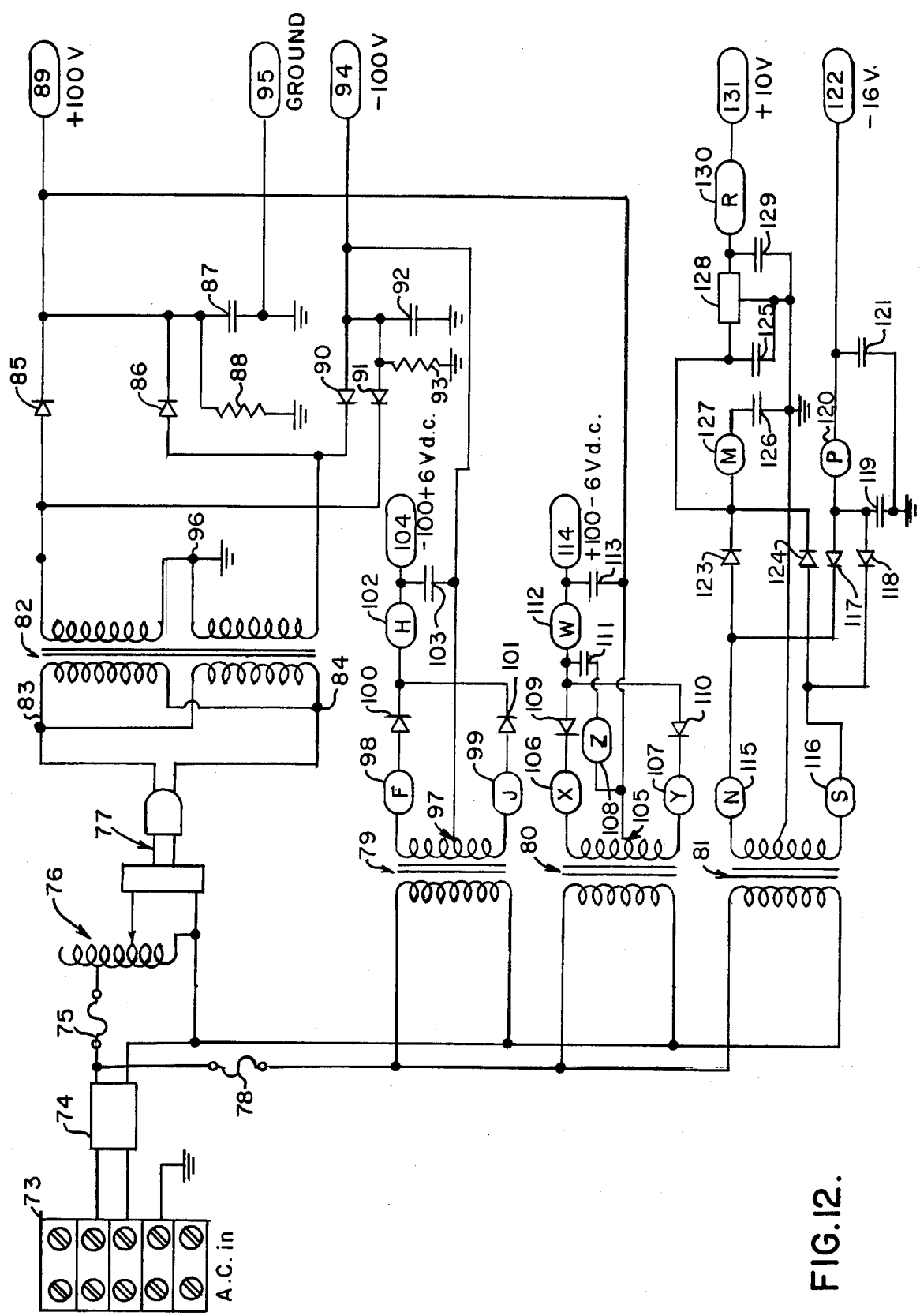
FIG. 12 provides a circuit diagram for the power supply of the sequence layout disclosed in FIG. 11.

The power supply 66 for the reciprocating motor/pump of this invention is disclosed more specifically in the circuit diagram shown in FIG. 12. The incoming power, which may comprise 115 volt, alternating current, is connected to the terminal board input 73, and from here the charge is connected to the on/off toggle switch 74. The output of the toggle switch is fused at two locations, the 15 amp fuse 75 supplies power to a variac 76 whose output, adjustable from 0 volts AC to 100 volts AC, is connected to a plug 77. The 1 amp fuse 78 supplies power to the primary of the transformers 79, 80, and 81.

The output of the variac 76 is supplied to the primary of the transformer 82 by way of the circuit lines 83 and 84, from the electrical plug 77. The center tap secondary of the transformer 82 is rectified by the diodes 85 and 86, and then filtered by means of the capacitor 87 and resister 88 to produce the adjustable +100 volts direct current, power supply at the terminal 89. The secondary of the transformer 82 is also rectified by the diodes 90 and 91, and then filtered by means of the capacitor 92 and the resister 93 to produce the adjustable −100 volts, direct current power supply at the terminal 94, as shown. Ground is available at the terminal 95. The secondary of the transformer 82 is grounded at its center tap 96, as shown.

The transformer 79 is a step down transformer, its center tap secondary 97 is connected to the printed circuit board (PCB) on terminal pins 98 and 99, and is rectified by the diodes 100 and 101 and exits the PCB at terminal pins 102. It is then filtered by the capacitor 103, resulting in a +6 volt direct current power supply at terminal 104. The common of this power supply is the −100 volt, direct current supply. Thus, the +6 volt supply will remain 6 volts positive with respect to the value of the adjustable −100 volt power supply.

Transformer 80 is also a step down type of transformer. Its center-tapped secondary 105 is connected to the printed circuit board on the terminal pins 106, 107, and 108. It is rectified by the diodes 109 and 110 and then filtered by the capacitor 111 and exits the printed circuit board upon the terminal pin 112. Capacitor 113 provides additional filtering that results in a −6 volts, direct current supply at terminal 114, as shown. The common for this circuit is the +100 volt power supply, and therefore the terminal 114 remains 6 volts negative with respect to the adjustable +100 volt power supply.

The center tapped secondary of the transformer 81 enters the printed circuit board at the terminal pins 115 and 116. It is rectified by the diodes 117 and 118 and filtered by the capacitor 119. The charge exits the printed circuit board on the terminal pin 120, and is filtered by means of the capacitor 121 resulting in a negative 16 volt direct current power supply at the terminal 122.

The secondary of the transformer 81 is also rectified by the diodes 123 and 124, with filtering being provided by means of the capacitor 125, and the external capacitor 126 by means of the terminal pin 127 of the printed circuit board. This develops the input to the voltage regulator 128, whose output is filtered by means of the capacitor 129. The output exits the printed circuit board at the terminal pin 130 which results in a regulated +10 volts, direct current power supply on the terminal 131 as shown. This provides for the regulated power supply that is furnished to the other electrical instrumentalities of this apparatus, so that various power levels are provided for furnishing charge at their regulated levels, to selected of the operating components of this invention, which will be hereinafter described.

Figure 13:
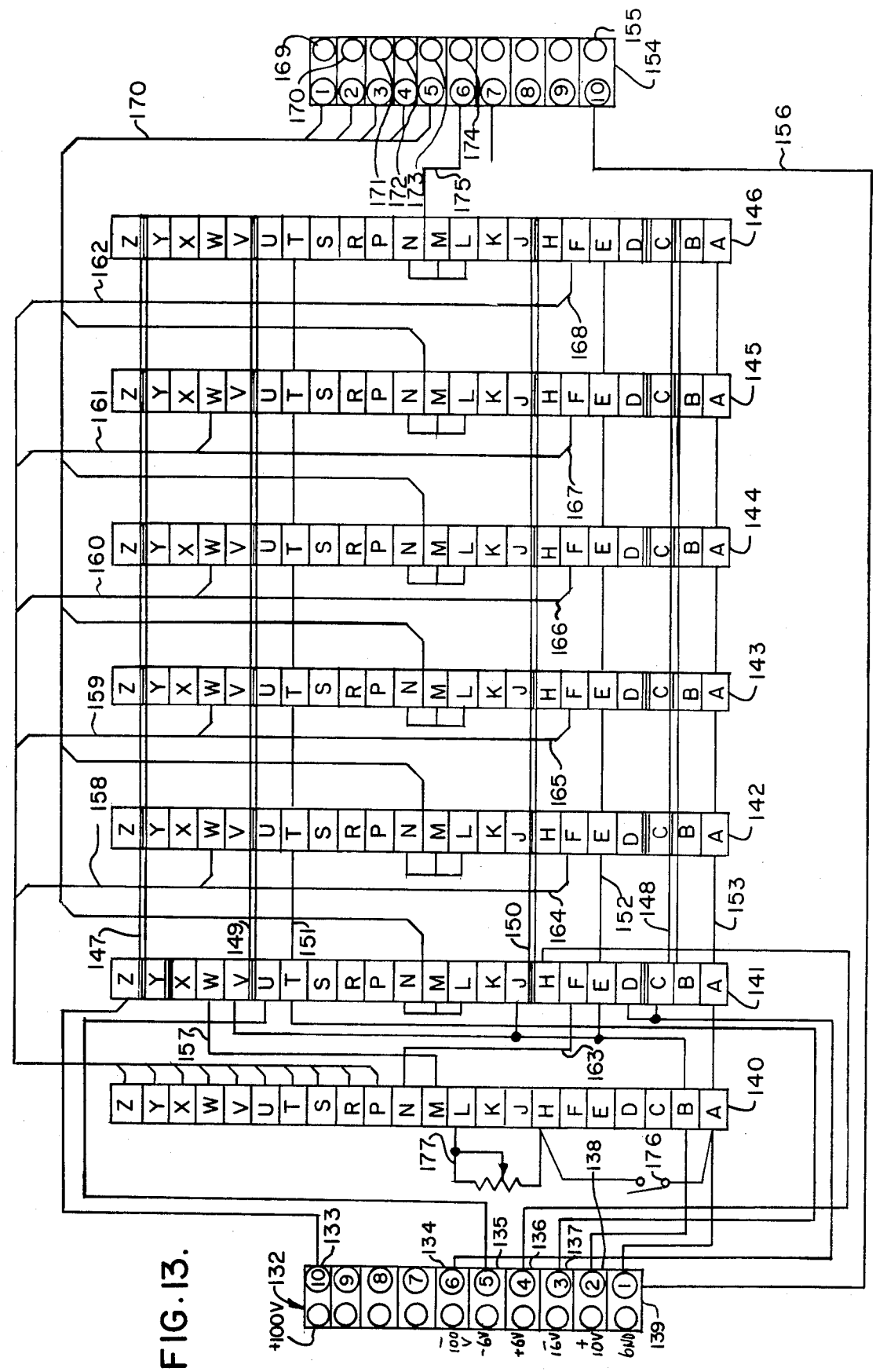
FIG. 13 provides a schematic view of the various sequence and driver boards for the sequence layout disclosed in FIG. 11.

FIG. 13 discloses what is identified as the chasis wiring board, and which shows the sequence of wiring that interconnect the sequence board and the coil driver boards together, in order to afford their proper sequence of operations during the functioning of the reciprocating means of this invention. As disclosed, all the various voltage levels from the power supply leading to the wiring of the electronic layout board is disclosed. All power supplies connect to the input terminal strip 132. The positive 100 volt supply connects to pin 133, the −100 volt supply connects with pin 134, the negative 6 volt supply is conducted to the pin 135, the positive 6 volt supply to the pin 136, the negative 16 volt supplied to the pin 137, the positive 10 volts are supplied to the pin 138, while the pin 139 connects with ground.

There are seven printed circuit board sockets connecting in the panel, and the sequence board secures with the socket 140, while the six coil driver boards connect through the sockets 141 through 146. Obviously, there will be a coil drive board socket, such as those just described, for each number of electromagnetic coils 6 provided along the length of the reciprocating means of this invention.

The positive 100 volts is supplied from the terminal board 139, and more specifically its pin 133, and is wired to the socket number 141, through its pins X, Y, and Z, as shown. A bus board, as at 147, connects this power supply to all of the coil driver board sockets 141 through 146, and their associated pins X, Y, and Z, as can be seen.

The negative 100 volt is supplied from the terminal board 139, through its pin 134, which is wired to the driver board socket 141 by connection to its pins, B, C, and D. A bus bar 148 connects this supply to all of the coil driver board sockets 141 through 146, along its associated connecting pins B, C, and D.

The negative 6 volts are supplied from the terminal board 139 by way of the connecting pin 135, and is wired to all of the coil driver board sockets 141 through 146, and more specifically its pin U through the bus 149.

The positive 6 volts are supplied from the terminal board 139 by way of its pin 136 by wiring to all of the coil driver board sockets 141 through 146 by way of connection with the pin H, and through its interconnecting bus 150.

The −16 volts are supplied from the terminal board 139 by way of the pin 137 which is wired to all of the coil driver board sockets 141 through 146 by interconnection through the pins T by way of the bus 151.

The positive 10 volts are supplied from the terminal board 139 through its pin 138 which is wired to the socket 140, through its pin B, as shown. And, through this connection the pins E, J, and V also connect together by means of the buses 152, 150, and 149, as shown.

Ground is supplied by wiring from the terminal board 132 through its pin 139 to all of the coil driver board sockets 140 through 146 by way of the pins A interconnected by means of the bus 153. Ground also connect to the terminal board 154 through its pin 155 by way of the circuit line 156, as shown.

The positive drive signals are connected from the sequence board socket 140 to the coil driver board sockets 140 through 146 as follows. The sequence board socket 140 through its pin M connects to the driver board socket 141 through its pin W by way of the circuit line 157. The sequence board socket 140, and more specifically its pin R connects to the coil driver board socket 142 through its pin W, by way of the circuit line 158. The sequence board socket 140, and more specifically its pin S connects to the coil driver board socket 143 and its pin W by way of the circuit line 159. The sequence board socket 140, and its pin U connects to the coil driver board socket 144, and its pin W through the circuit line 160. The sequence board socket 140, and more specifically its pin X, connects to the coil driver board socket 145, and its pin W, by means of the circuit line 161. And, the sequence board socket 140, and its pin Y, connects to the coil driver board socket 146, and its pin W by way of the circuit line 162.

The negative drive signals are connected from the sequence board socket 140 to the coil driver board sockets 141 through 146 as follows. The sequence board socket 140 connects by way of its pin N to the coil driver board socket 141 through its pin F, by way of the circuit line 163. The sequence board socket 140 connects from its pin P to the coil driver board socket 142 and its pin F by means of the circuit line 164. The sequence board socket 140, and its pin T, connects to the coil driver board socket 143 at its pin F by way of the circuit line 165. The sequence board socket 140, and its pin V, connects to the coil driver board socket 144, and its pin F, by means of the circuit line 166. The sequence board socket 140, and its pin W, connects to the coil driver board socket 145, and its pin F by way of circuit line 167. And, the sequence board socket 140, and its pin Z connects to the coil driver board 146, and its pin F, by way of circuit line 168.

The output signals from the coil driver board sockets 141 through 146 are connected to the terminal board 154 as follows. The coil driver board socket 141, through its pins L, M, and N connect to the terminal board 152, and to its pin 169 by way of the circuit line 170. Similar type connections are made to the pins 170 through 173 of the terminal board 154 through the circuit lines 170, as shown. The coil driver board 146, and its pins L, M, and N connect to the terminal board 154 and its pin 174 through the circuit line 175. Connections are made from the terminal 154 to each of the electromagnetic induction coils of the reciprocating means through these terminal pins 169 through 174.

The oscillator disable toggle switch 176 is connected to the sequence board socket 140, and its pins A and H, as shown. The oscillator rate potentiometer 177 is connected to the sequence board socket 140 through its pins H and L, as can be seen. These are the various wiring connections made to provide for the panel wiring of this invention, that furnishes the sequencing of the charge conducted to the electromagnetic coils of the reciprocating means.

The rate at which the pump operates is controlled by the oscillator circuit, such as that disclosed in FIG. 14. The oscillator is composed of the integrated circuit and gates 178, 179, and 180. In addition, the resistor 181, the capacitor 182 and the external rate adjustment potentiometer 183 connect to the printed circuit board (PCB) on its pins 185 and 186. This is a free running oscillator and can be disabled by external toggle switch 187 which connects to the PCB on the pin 185. Blocking diode 183a is included within the potentiometer with this switch closed the oscillator stops and there is no pump motion. It may be commented that the pins 185 and 186 correspond respectively to the lines H and L of the printed circuit switch as disclosed in FIG. 13.

Each complete cycle of the controller, which results in one stroke of the pump, is comprised of ten steps numbered 0 through 9, as shown. In order to move the pump piston, two coils are energized on each strip at any one time. The coils energized on each step and their polarity is shown upon the sequence of operation chart disclosed in FIG. 15. The following description explains how this is accomplished during the operations of this pump/motor apparatus. It may also be commented, once again, that during the operations of this apparatus, only two coils need be energized at any one time, at reverse polarities, and therefore significant energy savings is accomplished during the operations of this apparatus, with energy being conserved significantly due to the precise and selective operations of the coils during its functioning.

The integrated circuit board-P, disclosed at 188, is a decade counter. Each of its outputs (0-9) goes high in sequence. It is advanced one step per each oscillation pulse which is applied at the pin 189. After the counter reaches step 9, it resets back to stage 0 and thus the cycle repeats itself over again. The circuit composed of resister 190, capacitor 191 and the IC-N gate 192 was designed as a reset for the counter. With the former four coil pump only six steps were needed for one stroke of the pump. In that embodiment, pin 1 of the IC-P 188 was tied to the capacitor 191 at the side that is now grounded. The output of the IC-N gate 192 was tied to the reset pin of the IC-P 188. This resets counter after step six, but that particular circuit is no longer functional unless the apparatus is constructed as a four coil pump/motor apparatus.

During stage 0 of operation, pin 3 of the IC-P 188 is high, enabling IC-K gate 193. Its output now goes low. This gate is connected to pins 194 and 195 of IC-A gate 196 and pin 197 of the IC-B gate by way of the solder terminals 198, 199, 200 and 201. The output of the IC-A gate 196 goes high and is inverted by the IC-M gate 197. This signal is conducted through the printed circuit board on pin 202, and provides the negative trigger for the coil No. 1 or the first of the coils arranged along the apparatus as disclosed in FIG. 2. Thus, coil No. 1 is negatively energized. The output pin 203 of the IC-B gate 204 also goes high. The capacitor 205 now charges through the potentiometer. This provides a slight time delay before the input of the IC-B gate 207 can go high. These R-C networks provide some control over the acceleration of the piston cylinder for smoother operation. The diode 208 provides a quick discharge path for the capacitor 205. The output of the IC-B gate 207 now goes low. This forces the output of the IC-B gate 209 to go high. It is then inverted by the IC-M gate 210, as shown. This low signal exists upon the printed circuit board on pin 211 and supplies positive triggering energy to the coil No. 2 driver board, or the second of the coils disclosed in FIG. 2. Thus coil No. 2 is positively charged.

On the next ocillator cycle IC-P 188 advances to stage No. 1. Now its connecting pin goes high enabling the IC gate 212. Its output goes low and is applied to the IC-B gate 213 and the IC-C gate 214 by way of the solder terminals 215, 216 and 217. The output of the IC-B gate 213 goes high and is inverted by the IC-M gate 218. This signal exits the PCB on the pin 219 and applies negative trigger to the coil No. 2 driver board. Thus coil No. 2 is negatively energized. The output of the IC-C gate 214 goes high and charges capacitor 220 through the potentiometer 221. Diode 222 provides a quick discharge path for the capacitor 220. After capacitor 220 charges the output of the IC-C gate 223 it goes low forcing the output of the IC gate 224 to go high. This signal is inverted by the IC gate 225 and exits the PCB at the pin 226. This applies positive trigger to the coil No. 3 driver board. Thus, coil No. 3, or the third coil, as shown in FIG. 2, is positively energized.

On the next oscillator cycle IC 188 advances to stage No. 2, as shown. Its connection is now maintained high enabling the IC gate 227. Its output goes low and is applied to the IC gate 228 and the IC gate 229 via the solder terminals 230, 231 and 232, as shown. The output of the IC gate 228 goes high and is inverted by the IC 233. This signal exits the PCB at pin 234 and applies negative trigger to the coil No. 3 driver board. Thus, coil No. 3 is negatively energized. The output of the IC gate 229 goes high, charging its capacitor 235 through the potentiometer 236. The diode 237 provides for a rapid discharge for the capacitor 235. After the capacitor 235 charges, the output of the IC gate 238 goes low forcing the output of the IC gate 239 to go high. This signal is inverted by the IC gate 240 and exits the PCB at the pin 241, applying a positive trigger for the coil No. 4 driver board, and thus the fourth coil is positively energized.

On the next oscillator cycle the IC board 188 advances to stage No. 3, as shown. Its pin goes high enabling the IC gate 242. Its output goes low and is applied to the IC gate 243 and the IC gate 244 by way of the terminals 245, 246 and 247. The output of the IC gate 243 goes high and is inverted by the IC gate 248. This signals exits the printed circuit board at pin 249 and supplies negative trigger to the fourth coil driver board, and thus the fourth electromagnetic coil is energized. The output of the IC gate 244 goes high and charges the capacitor 250 through its potentiometer 251. The diode 252 provides for a quick discharge path for the said capacitor. After the capacitor charges, the output of the IC gate 253 goes low forcing the output of the IC gate 254 to go high. This signal is inverted by the IC gate 255 and exits the printed circuit board on the pin 256, applying positive trigger to the fifth coil driver board, and thus the fifth coil of the apparatus, as shown in FIG. 2, is positively energized.

On the next oscillator cycle the IC board 188 advances to stage No. 4, as shown. Its connecting pin goes high enabling the IC gate 257. Its output then goes low and is supplied to the IC gate 258 and the IC gate 259 by way of the terminals 260, 261, 262, and 263. The output of the IC gate 258 goes high and is inverted by the IC gate 265. This signal exits the PCB at pin 266 and applies negative trigger to the fifth coil driver board, and thus the fifth coil is negatively energized. The output of the IC gate 259 goes high and charges capacitor 267 through its associated potentiometer 268. The diode 269 provides for a rapid discharge path for the capacitor 267. After the capacitor 267 charges, the output of the IC gate 270 goes low forcing the output of the IC gate 271 to go high. This signal is inverted by the IC gate 272 and leaves the PCB at pin 273 applying positive trigger to the sixth coil driver board, and thus the sixth coil is energized positively.

On the next oscillator cycle the IC board 188 advances to stage No. 5. Its pin goes high enabling the IC gate 274. Its output goes low and is applied to the IC gate 244 and the IC gate 275 by way of the terminals 276, 277, 278 and 279. The output of the IC gate 275 goes high and is inverted by the IC gate 280. This signal exits the PCB at pin 281 applying negative trigger to the sixth coil driver board, and thus the coil No. 6 is negatively energized. The output of the IC gate 244 goes high and charges capacitor 250 through its potentiometer 251. Its diode 252 provides a quick discharge path for the said capacitor. After capacitor 250 charges, the output of the IC gate 253 goes low forcing the output of the IC gate 254 to go high. This signal is inverted by the IC gate 255 and exits the PCB at pin 256, applying positive trigger to the fifth coil driver board, and at this time the fifth coil is positively energized.

On the next oscillator circuit cycle the board 188 advances to stage No. 6, as shown. Its pin goes high enabling the IC gate 282. Its output goes high and is applied to the IC gate 229 and the IC 258 by way of the terminals 283, 284 and 285. The output of the IC gate 258 goes high and is inverted by the IC gate 265 applying negative trigger to the fifth coil driver board, and thus, the fifth coil is negatively energized. The output of the IC gate 229 goes high and charges its capacitor 235 through the potentiometer 236. The diode 237 provides a quick discharge path for the capacitor. After capacitor 235 charges, the output of the IC gate 238 goes low forcing the output of the IC gate 239 to go high. This signal is inverted by the IC gate 240 and exits the PCB at pin 241, applying positive trigger to the fourth coil driver board, and thus the fourth coil is positively energized.

On the next oscillator cycle the IC board 188 advances to stage No. 7. Its pin goes high enabling the IC gate 286. Its output goes low and is applied to the IC gate 243, and the IC gate 214 by way of terminals 287, 288, and 289. The output of the IC gate 243 goes high and is inverted by the IC gate 248. This signal exits the printed circuit board at pin 249 applying negative trigger to the fourth coil driver board, and thus the fourth coil of the apparatus shown in FIG. 2 is negatively energized. The output of the IC gate 214 goes high charging its capacitor 220, through the potentiometer 221. The diode 222 provides a quick discharge path for the capacitor. After the capacitor 220 charges, the output of the IC gate 223 goes low forcing the output of the IC gate 224 to go high. This signal is inverted by the IC gate 225 and exits the PCB at pin 226 applying positive trigger to the third coil driver board, and thus the third coil is positively energized at this moment.

On the next oscillator cycle the IC board 188 advances to stage No. 8. Its pin goes high enabling the IC gate 290. Its output goes low and is applied to the IC gate 204 and the IC gate 228, by way of the terminals 291, 292, and 293. The output of the IC gate 228 goes high and is inverted by the IC gate 233. This signal exits the printed circuit board at pin 234, applying negative trigger to the third coil driver board, and thus the third coil is negatively energized. The output of the IC gate 204 goes high charging the capacitor 205 through its potentiometer 206. Diode 208 provides a quick discharge path therefrom. After the capacitor charges, the output of the IC gate 207 goes low forcing the output of the IC gate 209 to go high. This signal is inverted by the IC gate 210 and exits the PCB at pin 211, applying positive trigger to the second coil driver board, and thus the second coil is positively energized at this instant.

On the next oscillator cycle the IC board 188 advances to stage No. 9. Its connecting pin goes high enabling the IC gate 294. Its output goes low and is applied to the IC gate 295 and the IC gate 213 by way of the terminals 296, 297, 298 and 299. The output of the IC gate 213 goes high and is inverted by the IC gate 218. This signal exits the PCB at pin 219, and applies negative trigger to the second coil driver board, and thus the second coil is negatively energized. The output of the IC gate 295 goes high charging its capacitor 300 through its potentiometer 301. The diode 302 provides for a quick discharge path for its capacitor. After the capacitor 300 charges, the output of the IC gate 303 goes low forcing the output of the IC gate 304 to go high. This signal is inverted by the IC gate 306 and exits the PCB at pin 307, applying positive trigger to the first coil driver board, and thus the initial coil of the apparatus is positively energized.

The decade counter IC 188 resets to stage 0 on the next oscillator cycle. The whole sequence thus continues and repeats itself as long as the oscillator has not been disabled.

Figure 16:
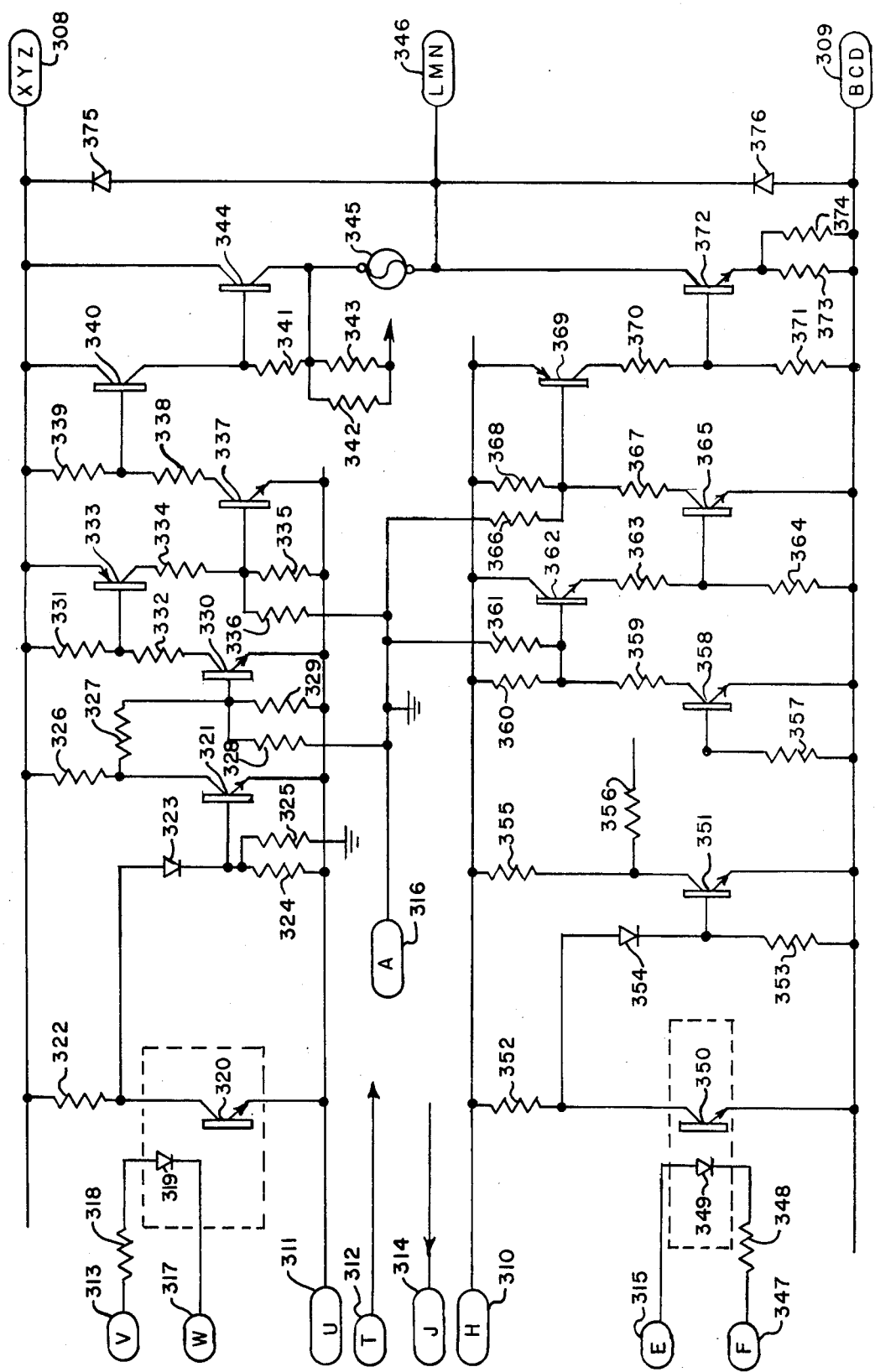
FIG. 16 provides the circuit diagram for each of the identically constructed coil driver boards for the pump of this invention.

The coil driver printed circuit board (PCB) receives six power supplies. The adjustable +100 volt supply connected to the PCB pins x, y, and z, at terminal 308, as shown in FIG. 16. The adjustable negative 100 volt supply is connected to the PCB pins B, C, and D at terminal 309. The positive 6 volt supply connected to the pin H at 310, while the negative 6 volt is supplied to the pin U at 311. The negative 6 volt is supplied to the pin T at 312, while the positive 10 volts are supplied to the pins V, 313, J, 314, E, 315, and to ground at pin A, 316.

A low (0 volt) signal is applied to the pin W, 317, and results in a positive current flow through the induction coil. This is accomplished through the following procedure. Charge flows through the resistor 318 and to the biased diode 319. This forces the phototransistor (composed of the said diode 319 and the transistor 320) to conduct. The transistor 321 is normally biased on by the current flow through the resistor 322, the diode 323, and the resistors 324 and 325, developing a positive potential on the base of the said transistor 321 with respect to its emitter. With transistor 320 biased on, its collector (and thus the base of the transistor 321) goes near a negative 6 volts turning the transistor 321 off.

With transistor 321 turned off, current flows through the resistors 326, 327, 328, and 329. This develops a positive potential across the base-emitter junction of transistor 330, thus forcing it to conduct. Current now flows through the resistors 331, 332, and the transistor 330. This forward biases the base-emitter junction of the transistor 333, thus forcing it to conduct. This allows current flow through the transistor 333, and the resistors 334, 335, and 336, thus forwardly biasing the transistor 337. Current now flows through the transistor 337, and the resistors 338 and 339. This results in the transistor 340 to commence conducting. The voltage divider consisting of transistor 340 and the resistors 341, 342 and 343 applies a postive potential across the base-emitter junction of the transistor 344, thus forcing it into conduction. Current will now flow from the adjustable positive 100 volt supply through the transistor 344, and the fuse 345, and exit the printed circuit board on the pins L, M and N, as at 346, and flow through the induction coil, and return to ground.

In the same manner, a low (0 volt) signal as applied to the pin F 347 results in a negative current flow through the induction coil. This is accomplished by the following procedure.

The current flows through the resistor 348 and forward biases the diode 349. This forces the phototransistor (composed of the diode 349 and the transistor 350) to conduct. Transistor 351 is normally biased on by the current flow through the resistors 352 and 353, and the diode 354, developing a positive base to emitter potential on the said transistor 351. With the transistor 350 being turned on, the transistor 351 no longer is forward biased and thus turns off. The current now flows through the resistor 355, the resistor 356, and the 357. This forces the transistor 358 into conduction. Current flows through the transistor 358, and the resistors 359, 360, and the resistor 361, which sets up a forward biasing of the transistor 362. With transistor 362 now conducting, current flows through the resistors 363 and 364. The transistor 365 thus conducts and passes current through the resistors 366, 367, and 368, thus turning on the transistor 369. Current now flows through the transistor 369 and its associated resistors 370 and 371. This thus forces the transistor 372 into conduction. Current now can flow from the adjustable negative 100 volt supply through the resistors 373 and 374, and the transistor 372, and be conducted from the printed circuit board through the pins L, M, and N, at 346 and flow through the induction coil and return to ground. And, diodes 375 and 376 are provided for suppression of the high voltage spikes generated by the induction coils. This thus explains the operation of the circuitry for each of the coil driver boards that are operatively associated with each of the electromagnetic coils 6 as previously explained in FIG. 2 of the apparatus.

Figure 17:
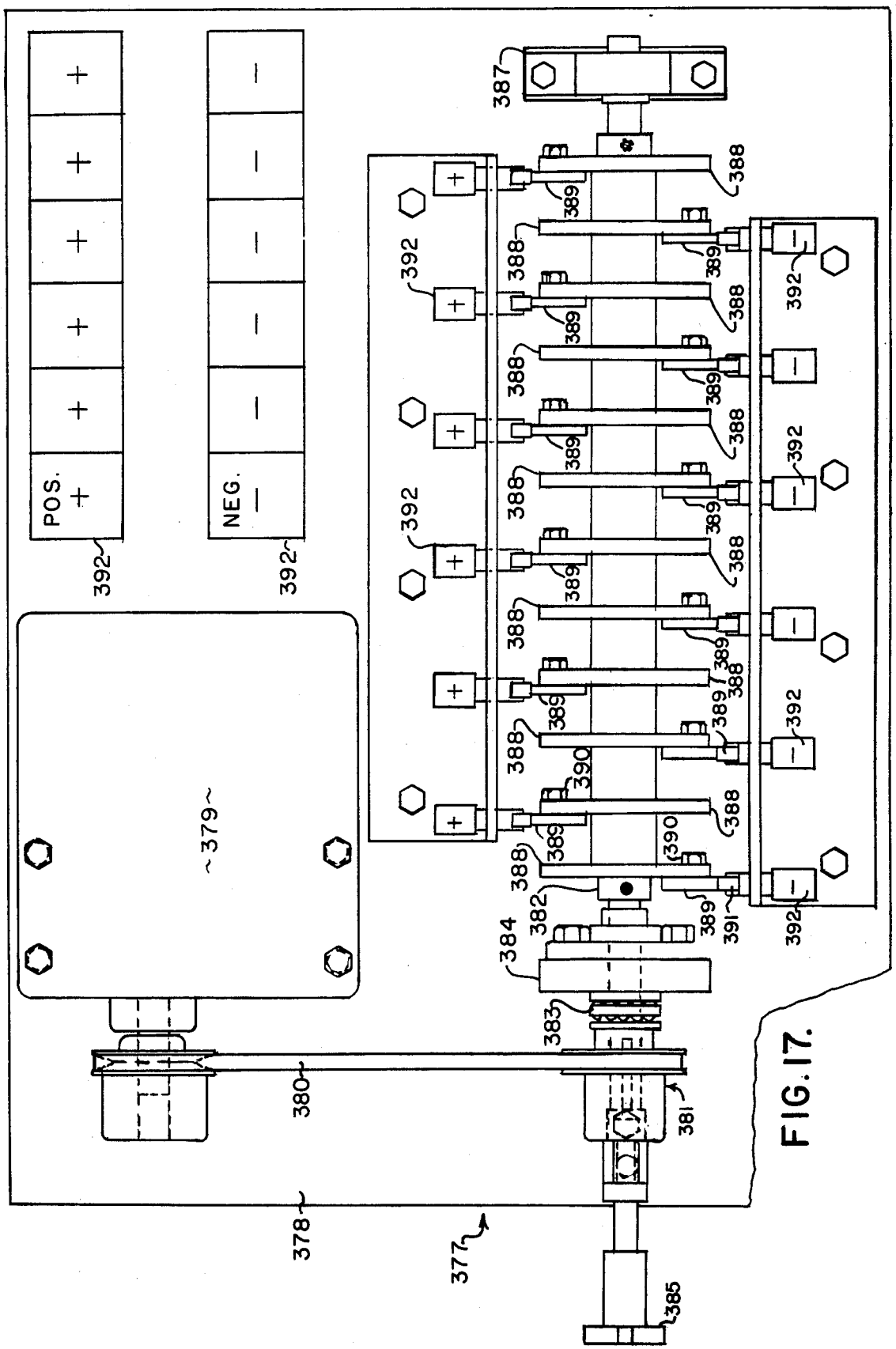
FIG. 17 provides a plan view of a mechanical controller useful within a modified version of the pump of this invention, and may replace the electronically operated sequence and coil driver boards of the electrically energized pump as disclosed in FIG. 11.
Figure 18:
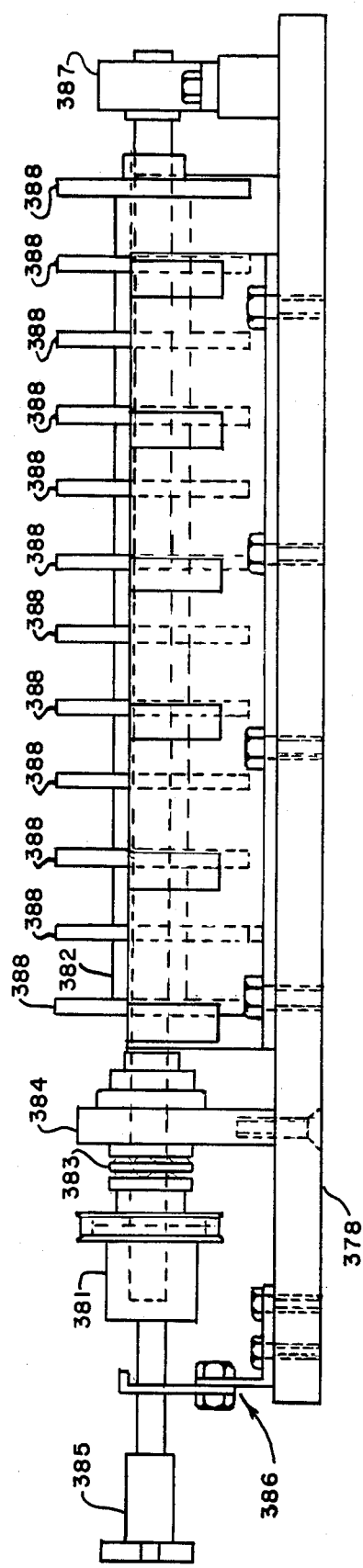
FIG. 18 provides a side view of the mechanical controller shown in FIG. 17.

In referring once again to the drawings, and in particular FIGS. 17 and 18, the alternative form of sequencing means, in this instance comprising the mechanical type of sequencer, and which provides for the timed conduct of charge to the electromagnetic coils of the apparatus for this reciprocating pump, is shown. This particular modification operates mechanically on the principle of utilizing camming means for providing for the sequential energization of the various pump/motor coils, rather than utilizing solely the solid state type of electronics for achieving such, as previously analyzed.

As shown, the timing means 377 may be mounted upon a base member 378, and includes a variable speed motor 379 which rotates an accompanying belt 380, which in turn provides rotation for the speed reducer 381, as shown. Generally, as in the preferred embodiment, the electric motor 379 revolves at approximately 659 rpm, or the like, whereas the speed reducer 381 functions to convert said revolutions down to approximately 30 rpm, or within a range that can be more practical in the application of the mechanical type of controller for this reciprocating pump. The speed reducer turns a shaft 382 coupled to it by means of the thrust bearing 383 and the pillow block 384. Disclosed at the opposite end of the shaft 382 is an adjustment means 385 which can be effectively turned for adjustment of the speed generated by the speed reducer, so that the speed of rotation of the shaft 382 can be generally set between approximately 30 to 60 rpm, or within the range desired. As can also be seen in FIG. 18, the adjustment means 385 is supported by means of the bracket 386 upon the base member 378. This speed reducer, and its associated components, such as the adjustment means, may be obtained from Browning Mfg Co., located in Maysville, KY, and comprises Model Nos. 3MC, 3SL, and 36290.

As can be seen, the shaft 382 is supported by the pillow block 384, at one end, and which pillow block 384 comprises a flanged model. At the opposite end of the shaft 382 is a standard shaft pillow block 387 useful for supporting said shaft at this location.

The shaft 382 has a series of disks 388 secured on it, and each disk incorporates a series of apertures (not shown) and to which a camming means 389 is connected by means of the fastener, such as the bolts 390 as shown. Thus, these camming means can be conveniently and very accurately set upon their respective disks, and arranged for triggering the switch means 391 of their respective microswitch 392. When this occurs, the particular coils associated with each set of microswitches are momentarily energized, so that the coils can be very precisely charged either positively, or negatively, within the sequence of operations of the reciprocating pump. And as identified upon each relay 392, and their respective switches, they can initiate the conduct of charge, either positively or negatively, as shown upon the accompanying chart, to the various coils during the sequence of the operation of their associated reciprocating pump.

Figure 19:
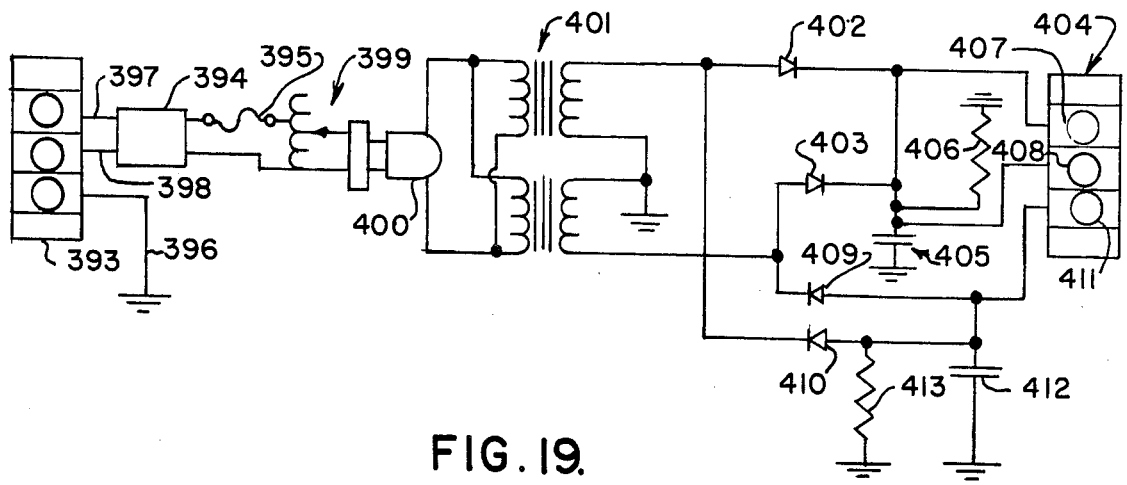
FIG. 19 provides an electrical circuit diagram of the power supply for the mechanical controller previously identified in FIG. 17.

FIG. 19 discloses the type of power supply used in conjunction with the mechanically actuated sequencer as shown in FIGS. 17 and 18 for this reciprocating pump. This power supply includes the terminals 393 that conducts alternating current to the apparatus. A switch 394 provides for control of the operations of the pump, and a fuse 395 is furnished therein for safety purposes. One side of the terminal is grounded through the circuit line 396, while the two additional leads 397 and 398 conduct charge to the variac 399. The variac is connected by means of a plug 400 to a transformer 401 wherein the charge is stepped up from approximately 100 volts to 200 volts a.c. The secondary side of the transformer connects through a series of diodes 402 and 403 wherein the charge is rectified full wave to provide a d.c. voltage to the terminals. The output charge at terminal 407 is approximately a positive 200 volts d.c. The output at terminal 408 is approximately a −200 volts d.c. Connecting with the bases of the diodes 402 and 403 are additional diodes 409 and 410, respectively, which block the passage of any wave forms therethrough, and provides for the terminal 411 to be established to ground. The capacitor 412 and resistance 413 function as a filter of the charge at this location.

Figure 20:
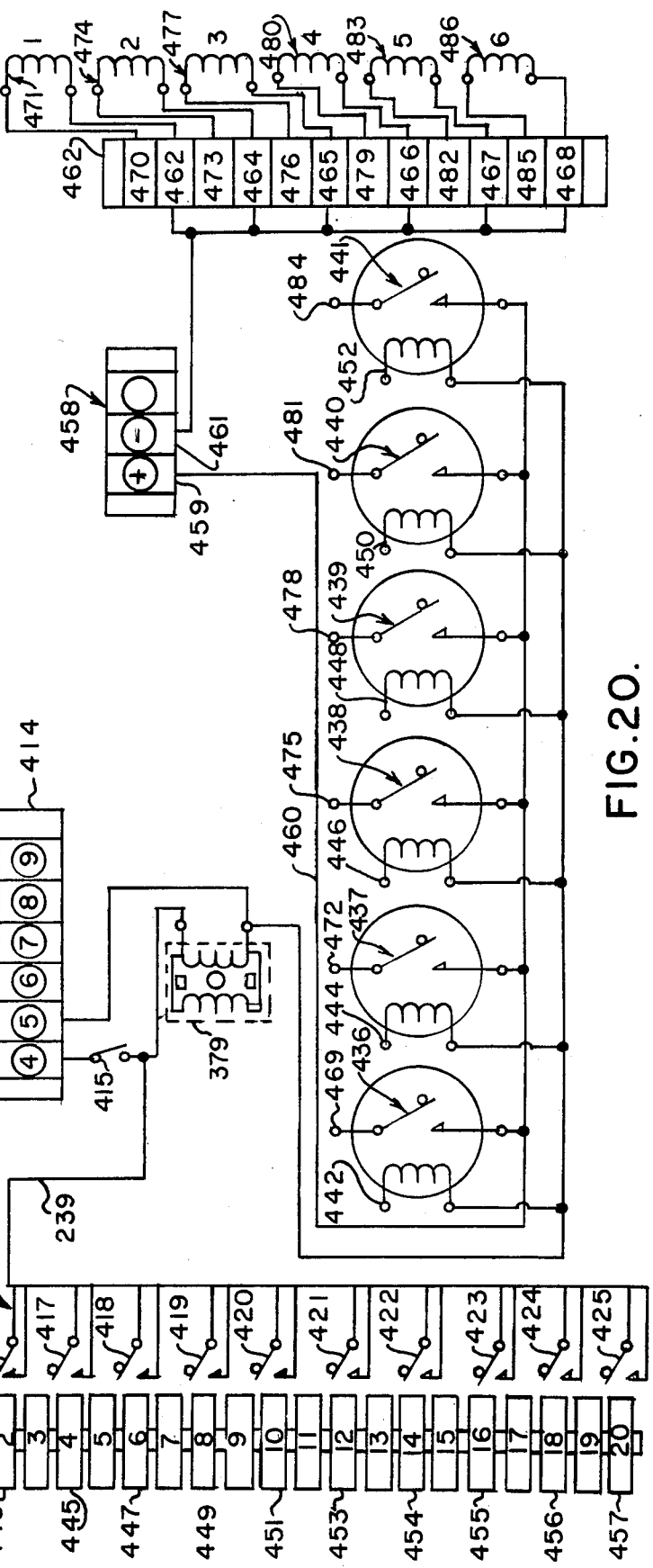
FIG. 20 provides a circuit diagram of the single pulse sequencer for the mechanical controller previously disclosed in FIG. 17.

FIG. 20 discloses the circuit diagram for the single pulse type of operation for the electromagnetic reciprocating pump/motor of this invention. As shown in this circuit diagram, the incoming power (115 volts a.c.) is connected to the terminal board a.c. in 414. From here it is connected to the on/off toggle switch 415. The output of the toggle switch goes to one terminal on the variable speed cam drive motor 379, as previously explained in FIG. 17, and to the stationary contacts of the cam microswitches 392, but which are herein specifically illustrated at 416 through 425. The other side of the 115 volts a.c. is connected from the terminal board 414 terminals to the other contacts on the variable speed cam drive motor 379, and to one side of the relay coils 436 through 441.

The sequence of operation of this mechanical controller means, single phase, is as follows.

The movable contact of the microswitch 416 goes to positive relay 436, relay coil terminal 442, by operation of the rotary cams 389, but more specifically the cam 443.

The movable contact of the microswitch 417 goes to the positive relay 437, its relay coil terminal 444, through the rotary cam 445.

The movable contact of the microswitch 418 goes to the positive relay 438, its relay coil terminal 446, through actuation by the rotary cam 447.

The movable contact of the microswitch 419 goes to the positive relay 439, through its relay coil terminal 448, through actuation by the rotary cam 449.

The movable contact of the microswitch 420 goes to the positive 440, through its relay coil terminal 450, by actuation by the rotary cam 451.

The movable contact of the microswitch 421 connects with the positive relay 441, which energizes at the relay coil terminal 452, through the actuation by the rotary cam 453.

The movable contact of the microswitch 422 connects with the positive relay 440, its relay coil terminal 450, through actuation by the rotary cam 454.

The movable contact of the microswitch 423 goes to the positive relay 439, its relay coil terminal 448, and is actuated by the rotary cam 455.

The movable contact of the microswitch 424, goes to the positive relay 438, energizes through its relay coil terminal 446, as actuated by the rotary cam 456.

The movable contact of the microswitch 425, connects through the positive relay 437, which energizes the relay coil terminal 444, through actuation by the rotary cam 457.

This completes the ten steps to sequencing of the relay energizing coils in proper order to close the d.c. contacts, on relays 436 through 441. The rate of speed of the closing of the contacts and length of time the contacts are closed is controlled by the cam disk 389, as generally shown. Also, the rate of speed of the closing of the contacts is controlled by the variable speed motor 379.

The incoming direct current power (0 through 90 volts) is connected to the terminal board direct current input 458. From here it is connected from its positive terminal 459 to the fixed or stationary contacts of the relays 436 through 441, by way of the circuit line 460. From the negative terminal 461 the terminal board 458 connections are made to the terminal board coil direct current outputs 462, along its terminals 463 through 468, as shown. When the relay coils on the relays 436 through 441 are sequentially energized, the following sequence of operations take place.

When contacts are closed on the relay 436, d.c. current flows to relay terminal 469, then to terminal 470, thus energizing the output of the coil 471. This would relate to the initial coil of the reciprocating apparatus as shown in FIG. 2.

When the relay contacts are closed at 437, d.c. current flows to the relay terminal 472, and then to terminal 473, thus energizing the output of coil 474.

When the contacts of relay 438 are closed, d.c. current flows to the relay terminal 475, and then to the terminal 476, thus energizing the output of the coil 477.

When the contacts of relay 439 are closed, direct current charge flows to the relay terminal 478, and then to terminal 479, thus energizing the output of the coil 480.

When the contacts of relay 440 are closed, direct current charge flows to the relay terminal 481, and then to the terminal 482, thus energizing the relay coil 483.

When the contacts are closed for the relay 441, direct current charge flows through the relay terminal 484, and to the terminal 485, thus energizing the output coil 486, as shown.

It might be commented that the coils 471, 474, 477, 480, 83 and 486, respectively relate to the first through sixth coils of the reciprocating apparatus as previously explained with regard to FIG. 2. Obviously, if other number of coils are provided within this reciprocating device, then additional circuitry along the lines of that previously described will likewise be provided in order that mechanical actuation and sequencing of the charge to each coil can be precisely made at the specific time required for actuating magnetically the movement of the piston within the reciprocating means. The energizing of the magnetic piston 7 within the sequentially controlled magnetic field caused the said piston to move in a linear motion within the piston cylinder thus effecting the pumping or motor action desired.

Figure 21:
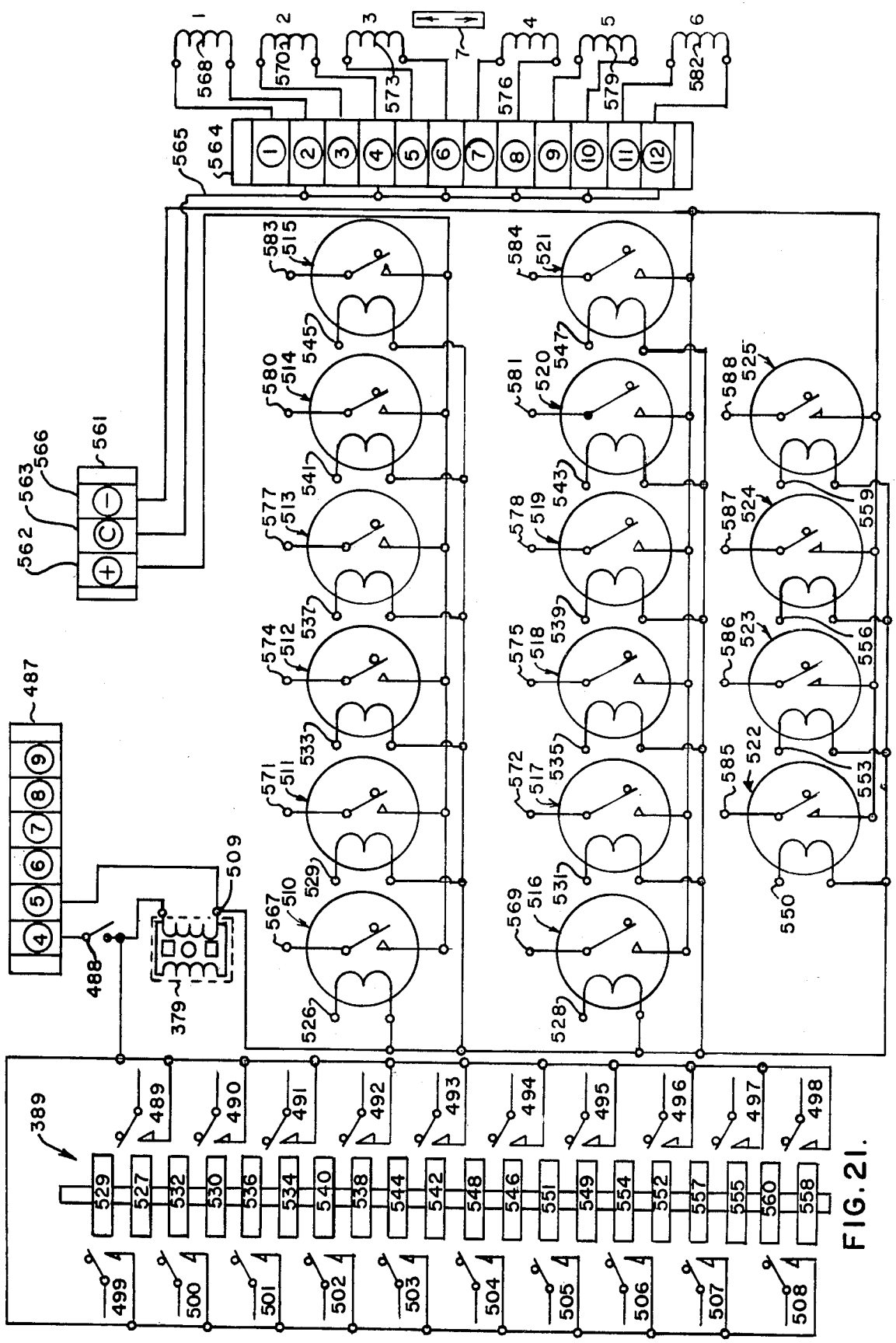
FIG. 21 provides an integral circuit diagram for the dual pulse sequencer controller for the mechanical controller shown in FIG. 17.

The mechanical controller for providing for dual pulsing of the reciprocating means, and more specifically its various electromagnetic coils, is shown in its circuit diagram in FIG. 21. The incoming power (115 volts a.c.) is connected to the terminal board alternating current input at terminal 487. From here the charge is conducted through an off/on toggle switch 488. The output of the toggle switch goes to one terminal on the variable speed cam drive motor 379, and to stationary contacts of the cam microswitches 489 through 508, as shown.

The other side of the 115 volt a.c. input is connected from the terminal board 487 terminals to the other contact on the variable speed cam drive motor 379. And, the same are also connected, as can be seen, at the terminal 509, to one side of the relay coils 510 through 525.

The sequence of operation of these double pulsed relays is as follows.

The movable contact on the microswitch 489 goes to the positive relay 510, through its relay coil terminal 526 through the actuation of the rotary cams 389, and more specifically the rotary cam 527, as shown. The movable contact on the microswitch 499, goes to the negative relay 516, through its relay coil terminal 528, through the actuation of the specific rotary cam 529. The movable contact of the microswitch 490 goes to the positive relay 511, through its relay coil terminal 529, upon the actuation of the rotary cam 530. The movable contact on the microswitch 500, goes to the negative relay 517, through its relay coil terminal 531, through the actuation of the rotary cam 532. The movable contact of the microswitch 941 goes to the positive relay 512, and through its relay coil terminal 533 through the actuation of the rotary cam 534. The movable contact of the microswitch 501 goes to the negative relay 518, through its relay coil terminal 535, through the actuation of the rotary cam 536. The movable contact of the microswitch 492 connects through the positive relay 513 and its relay coil terminal 537 through the actuation of the rotary cam 538. The movable contact of the microswitch 502 connects with the negative relay 519 and its relay coil terminal 539 through the actuations of the rotary cam 540. The movable contact of the microswitch 493 goes to the positive relay 514, and connects through its relay coil terminal 541 through the actuation of its rotary cam 542. Alternatively, the movable contact of the microswitch 503 goes to the negative relay 520, to charge its relay coil terminal 543, through the actuation of the rotary cam 544. The movable contact of the microswitch 494 goes to the positive relay 515, and affects energization of its relay coil terminal 545, through the actuation of the rotary cam 546. Alternatively, the movable contact of the microswitch 504 connects with the negative relay 521, for energizing its relay coil terminal 547, through the actuation of the rotary cam 548.

The movable contact of the microswitch 495 goes to the positive relay 514, its relay coil terminal 541, through the actuation of the rotary cam 549. The movable contact of the microswitch 505 goes to the negative relay 522, through its relay coil terminal 550 through the actuation of the rotary cam 551. The movable contact of the microswitch 496 connects to the positive relay 513, its relay coil terminal 537, when actuated by the rotary cam 552. The movable contact of the microswitch 506 connects to the negative relay 523, through its relay coil terminal 553, through the actuation by its rotary cam 554. The movable contact of the microswitch 497 goes to the positive relay 512, through its relay coil terminal 533, upon actuation of the rotary cam 555. The movable contact of the microswitch 507 goes to the negative relay 524, through its relay coil terminal 556, through the actuation of the rotary cam 557. The movable contact of the microswitch 498 goes to the positive relay 511 through its relay coil terminal 529, through the actuation of the rotary cam 558. Finally, the movable contact of the microswitch 508, goes to the negative relay 525, through its relay coil terminal 559, through the actuation of the rotary cam 560.

Thus, this completes the ten steps to the sequence of the relay energizing coils and the dual pulsed mechanical controller, in their proper order, to close the d.c. contacts on the said relays 510 through 525. The rate of speed of closing of the relay contacts and the length of time the contacts are closed is controlled by the cam disk generally identified as 389. Also, the rate of speed of the closing of the contact is controlled by the variable speed of the motor 379.

The incoming direct current power (0-90 volts positive) and the (0-90 volts negative) is connected to the terminal board direct current input 561. From here the (0-90 volts positive) 562 is connected to the fixed or stationary contacts of relays 510 through 515. The terminal board direct current input 563, is connected to the terminal board coil out 564 terminals No. 2, No. 4, No. 6, No. 8, No. 10, No. 12, as shown, by way of the circuit line 565.

The direct current power (0-90 volts negative) as at 566, is connected to the fixed or stationary contacts of relays 516 through 525. When the relay coils on the relays 510 through 525 are sequentially energized, the following electrical occurence takes place in sequence.

When the contacts are closed, as on relay 510, positive direct current flows to the relay terminal 567, and then to terminal No. 1 of the terminal board coil direct current out 564. Thus, such energizes the first output coil 568 to go positive. At the same time these contacts are being closed, relay 516 is also closed, conducting negative direct current to flow to the relay terminal 569, and then to the terminal No. 3 of the terminal board 564, thus energizing the second output coil 570 to go negative.

When the contacts are closed, the relay 511 conducts positive current to flow to its relay terminal 571, and then to the terminal No. 3 of the terminal board 564, thus energizing the second output coil 570 to go positive. At the same time, as these contacts are being closed, the relay 517 closes and conducts negative direct current to its relay terminal 572, and then to the terminal No. 5 of the terminal board 564, thus energizing the third output coil 573 negatively.

When the contacts are closed, such as through the actuation of the cam means 389, the relay 512 conducts positive current to its relay terminal 574, and then to the terminal No. 5 of the terminal board 564, thus energizing the third output coil 573 to go positive. At the same time, as the relay contacts are being closed, the relay 518 conducts negative direct current to, the relay terminal 575, and then to the terminal No. 7 of the terminal board 564, thus energizing the fourth output ooil 576 to go negative.

When the contacts are closed, the relay 513 conducts postive current to its relay terminal 577, and then to the terminal No. 7 of the terminal board 564, thus energizing the fourth output coil 576 to go positive. Simultaneously, as the contacts are being closed, relay 519 conducts negative direct current to its relay terminal 578, and then to the terminal No. 9 of the terminal board 564, thus energizing the fifth output coil 579 to go negative.

When the relay contacts are closed, the relay 514 conducts positive direct current to its relay terminal 580, and then to the terminal No. 9 of the terminal board 564, thus energizing the fifth output coil 579 to go positive. At the same time, as these contacts are being closed, relay 520 conducts negative direct current to its relay 581, which is conducted to the terminal No. 11 of the terminal 564, thus energizing the sixth output coil 582 to go negative.

When the contacts are closed, the relay 515 conducts positive direct current to flow to its relay terminal 583, and then to the terminal No. 11 of the terminal board 564, thus energizing the sixth output coil 582 to go positive. Concurrently, as the contacts are being closed, the relay 521 conducts negative direct current to its relay terminal 584, and then to the terminal No. 9 of the terminal board 564, thus energizing the fifth output coil 579 to go negative.

When the contacts are closed, the relay 514 conducts postive direct current to its relay terminal 580 and then to the ninth terminal of the terminal board 564, thus energizing the fifth output coil to go positive. At the same time, as the contacts are being closed, the relay 522 conducts negative direct current to its relay terminal 585, and then to the seventh terminal of the terminal board 564, thus energizing the fourth output coil to go negative.

When the contacts are closed, the relay 513 conducts positive direct current to its relay terminal 577, and then to the seventh terminal of the terminal board 564, thus energizing the fourth output coil 576 to go positive. At the same time, as the contacts are being closed, the relay 523 conducts negative direct current to the relay terminal 586, and then to the fifth terminal of the terminal board 564, thus energizing the third output coil 573 to go negative.

When the contacts are closed, the relay 512 conducts positive direct current to its relay terminal 574, and then to the terminal No. 5 of the terminal board 564, thus energizing the third output coil to go positive. Concurrently, as the contacts are being closed, the relay 524 conducts negative direct current to its relay terminal 587, and then to the terminal No. 3 of the terminal board 564, thus energizing the second output coil 570 to go negative.

When the contacts are closed, the relay 511 conducts positive direct current to its relay terminal 571, and enters the third terminal of the terminal board 564, thus energizing the second output coil 570 to go positive. Currently, as the contacts are being closed, the relay 525 conducts negative direct current to its relay terminal 588, and then to the first terminal of the terminal board 564, thus energizing the first output coil to go negative.

The energizing of the magnetic piston 7 within the sequentially controlled magnetic field causes the said piston to move in a linear motion reciprocally within the piston or internal cylinder 10, and thus causing the pumping or motor action to proceed.

Variations or modifications to the reciprocating motor/pump apparatus of this invention may occur to those skilled in the art upon reviewing the subject matter of this disclosure. Such variations or modifications, if within the spirit of this invention, are intended to be encompassed within the scope to any claims to patent protection issuing herein. For example, a pair or more of the type of piston shown in FIG. 4 may be located within a lengthy cylinder of the pump or motor means, and be reciprocatingly actuated by their individual and independent sets of electromagnets to function as boosters to forces generated upon the pistons and the output of the apparatus. The description of the preferred embodiment set forth in this application is done principally for illustration purposes only.

Having thus described the invention what is claimed and desired to be secured by Letters Patent is:

1. An electromagnetic reciprocating means for use for providing mechanical force for actuation of other means comprising a cylinder means, electromagnetic reciprocating means comprising a motor means, a closure means provided at each end of the said cylinder means, at least a pair of electromagnets operatively associated with said cylinder means, a magnetically responsive piston provided within said cylinder means and capable of longitudinally shifting reciprocally within said cylinder means upon the sequential energization of said electromagnets, an electrical circuitry means connecting with said electromagnets and upon energization charging said electromagnets in progressively timed sequence for inducing the reciprocal shifting of said piston within said cylinder means, said motor means comprising a linear reciprocating motor means, a drive shaft connecting with said piston, there being an aperture provided through a closure means at least at one end of said cylinder means, said drive shaft extending through the closure means aperture and furnishing linear moving force upon the reciprocating movement of said motor means piston, a seal formed between the reciprocating moving drive shaft and the closure means aperture, a spacer means provided between each of the adjacent electromagnets and the closure means, each electromagnet and the said spacer means provided substantially surrounding the internally arranged cylinder means, fastener means tightly securing the closure means, internally arranged cylinder means, spacer means, and electromagnets together, said reciprocating means as secured together being hermetically sealed, and seal provided between the internally arranged cylinder and the closure means to prevent leakage at their areas of contact.

2. The invention of claim 1 and wherein said electrical circuitry including an electrical energy power supply means, sequential circuitry means connecting with said power supply means and including a series of gates and being useful for regulating the rate and timing of the delivery of electrical charge to the electromagnets, and a coil driver circuitry means electrically connecting with each electromagnet and also connecting with the sequencing circuitry means and useful for regulating the quantity of charge delivered to each of the particular electromagnets during operation of the reciprocating means.

3. The invention of claim 2 and wherein said sequencing circuitry means including an oscillator section, a sequence counter decoder logic section coupled with the oscillator section and which translates the pulses generated by the oscillator section into sequential outputs, and a pre-stage coil driver section which functions as a buffer between the sequence counter decoder logic section and the coil driver circuitry means.

4. The invention of claim 3 and wherein the coil driver circuitry means receives low voltage signals from the sequencing circuitry means and converts the same into high voltage signals for conduct to the individual electromagnets of the reciprocating means.

5. The invention of claim 1 and wherein said electrical circuitry useful for providing single stage electrical pulsing of the electromagnets of the reciprocating means, said circuitry including a relay means for each electromagnet, mechanical means operatively associated with each relay means and provided for actuating its accompanying relay means in timed sequence, the actuation of the relay means conducting charge for momentary energization of the coil associated with its electromagnet for inducing movement of its responsive piston.

6. The invention of claim 1 and wherein said electrical circuitry useful for providing dual stage electrical pulsing of the electromagnets of the reciprocating means, said circuitry including relay means for each electromagnet, mechanical means operatively associated with each relay means and provided for actuating its accompanying relay means alternating at opposite electrical polarities and in timed sequence, the alternate actuation of each relay means conducting charge for momentary energization of said coil associated with its electromagnet for inducing movement of its responsive reciprocating means piston.

7. The invention of claim 1 and including there being at least a pair of pistons arranged for reciprocating within the cylinder means, and there being a combined electrical circuitry means and sets of electromagnets independently associated with each piston for effecting simultaneous directional shifting of said pistons in timed sequence.

* * * * *